(12) United States Patent
Hadano et al.

(10) Patent No.: US 11,830,307 B2
(45) Date of Patent: Nov. 28, 2023

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventors: Hiroyasu Hadano, Toyota (JP); Tatsunori Katoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/691,515

(22) Filed: Mar. 10, 2022

(65) Prior Publication Data

US 2022/0301374 A1 Sep. 22, 2022

(30) Foreign Application Priority Data

Mar. 16, 2021 (JP) .................. 2021-042888

(51) Int. Cl.
*G07C 9/22* (2020.01)
*B60W 50/14* (2020.01)
*G07C 9/00* (2020.01)

(52) U.S. Cl.
CPC ............... *G07C 9/22* (2020.01); *B60W 50/14* (2013.01); *G07C 9/00309* (2013.01); *B60W 2050/146* (2013.01); *B60W 2420/42* (2013.01); *B60W 2554/4029* (2020.02)

(58) Field of Classification Search
CPC .. G07C 9/22; G07C 9/00309; G07C 2209/63; B60W 50/14; B60W 2050/146; B60W 2420/42; B60W 2554/4029; E05F 15/77; E05F 15/71; E05F 15/73; E05Y 2900/542; E05Y 2900/55
See application file for complete search history.

(56) References Cited

U.S. PATENT DOCUMENTS

| | | | |
|---|---|---|---|
| 9,520,006 B1* | 12/2016 | Sankovsky | G07C 5/0808 |
| 10,131,323 B1* | 11/2018 | Sterling | B60R 25/01 |
| 2017/0016266 A1* | 1/2017 | Van Wiemeersch | B60K 37/06 |
| 2018/0141414 A1* | 5/2018 | Lota | B60N 2/002 |
| 2021/0138959 A1* | 5/2021 | Soni | G08G 1/16 |

FOREIGN PATENT DOCUMENTS

JP 08-199885 A 8/1996

* cited by examiner

*Primary Examiner* — Omeed Alizada
(74) *Attorney, Agent, or Firm* — Sughrue Mion, PLLC

(57) ABSTRACT

An information processing device includes a control unit. The control unit is configured to execute acquiring information about temperature inside or outside a vehicle, and generating a command to open or close a window included in the vehicle based on the information about the temperature inside or outside the vehicle.

20 Claims, 16 Drawing Sheets

INFORMATION PROCESSING DEVICE, INFORMATION PROCESSING METHOD, AND SYSTEM

CROSS-REFERENCE TO RELATED APPLICATION

This application claims priority to Japanese Patent Application No. 2021-042888 filed on Mar. 16, 2021, incorporated herein by reference in its entirety.

BACKGROUND

1. Technical Field

The present disclosure relates to an information processing device, an information processing method, and a system.

2. Description of Related Art

A technology to close a vehicle window or a sunroof by remote operation when the window or the sunroof is forgotten to be closed is known (e.g., Japanese Unexamined Patent Application Publication No. 08-199885).

SUMMARY

An object of the present disclosure is to ventilate inside a vehicle by remote operation.

One aspect of the present disclosure relates to an information processing device including a control unit. The control unit is configured to execute:
acquiring information about temperature inside or outside a vehicle, and
generating a command to open or close a window included in the vehicle based on the information about the temperature inside or outside the vehicle.

Another aspect of the present disclosure relates to an information processing method. The information processing method includes a computer executing:
acquiring information about temperature inside or outside a vehicle; and
generating a command to open or close a window included in the vehicle based on the information about the temperature inside or outside the vehicle.

Another aspect of the present disclosure relates to a system. The system includes: a vehicle; and a server. The vehicle includes a window that is operable by remote operation. The server is configured to transmit to the vehicle a command about an opening degree of the window. The vehicle is configured to acquire information about temperature inside or outside the vehicle and transmit the information to the server. The server is configured to generate a command to open or close the window included in the vehicle based on the information about the temperature inside or outside the vehicle, and transmit the command to the vehicle.

Another aspect of the present disclosure relates to a program for causing a computer to execute the information processing method, or a non-transitory storage medium that stores the program.

According to the present disclosure, it is possible to open and close a window of a vehicle to ventilate inside the vehicle by remote operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
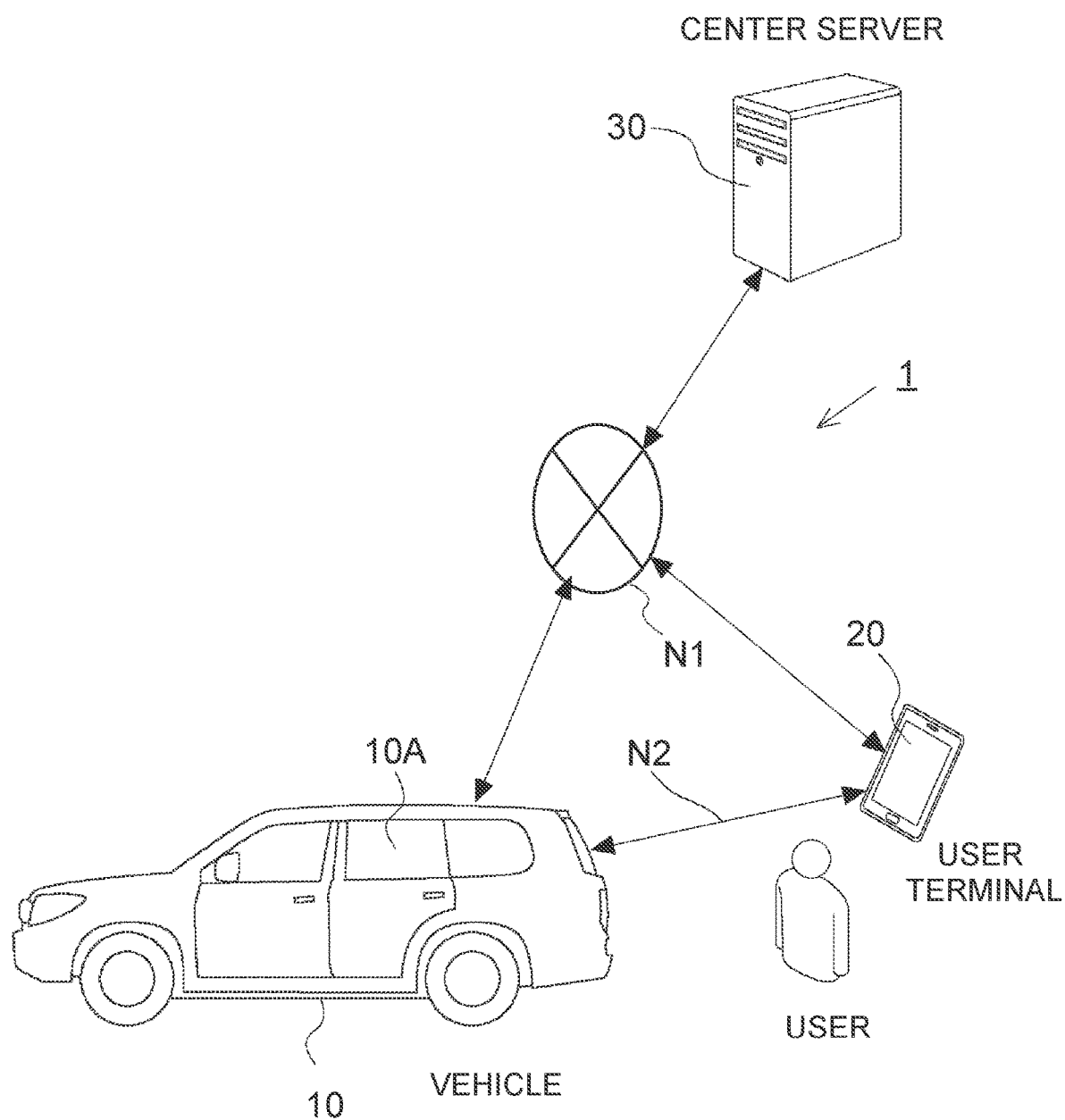
FIG. 1 shows the schematic configuration of a system according to an embodiment.

An information processing device as one aspect of the present disclosure includes a control unit. The control unit is configured to execute: acquiring information about temperature inside or outside a vehicle; and generating a command to open or close a window included in the vehicle based on the information about the temperature inside or outside of the vehicle.

The information about the temperature inside or outside the vehicle is acquired as information for determining whether or not ventilation is required in the vehicle. For example, when the temperature inside the vehicle is high, a window is opened for ventilation to attain a comfortable temperature inside the vehicle. In this case, the window may be opened when there is a difference between the temperature inside the vehicle and the temperature outside the vehicle. For example, when the temperature inside the vehicle is equal to the temperature outside the vehicle, opening the window does not change the temperature inside the vehicle, and therefore there is no necessity of opening the window. In such a case, preventing the window from being opened can restrain a third party from entering the vehicle or stealing items inside the vehicle. It is also possible to acquire the temperature outside the vehicle and estimate the temperature inside the vehicle based on the temperature outside the vehicle.

The control unit is also configured to generate a command to open or close the window included in the vehicle based on the information about the temperature inside or outside the vehicle. In response to the command, the window of the vehicle is opened or closed. In the present disclosure, the window of the vehicle may include a sunroof. By opening or closing the window of the vehicle in this way, ventilation inside the vehicle can be performed, and the temperature inside the vehicle can be adjusted. When the vehicle includes a plurality of windows, some or all of the windows may be opened or closed. A user may choose which windows to open or close.

The control unit may also generate a command to fully close the window when a person is detected within a prescribed distance from the vehicle. This makes it possible to restrain a third party from entering the vehicle or stealing items from the vehicle. The prescribed distance may be a distance with which a third party can reach and enter the vehicle, or may be a range where a polling signal of a smart key is within reach.

The control unit may also generate the command to fully close the window only when a person who does not possess an electronic key of the vehicle is detected within the prescribed distance from the vehicle. A user possessing an electronic key can be determined to be an authorized user. In the case of the authorized user, ventilation can be promoted by not closing the window.

The control unit may also detect the person based on an image taken with a camera included in the vehicle. By analyzing the image taken with the camera, it is possible to determine whether the person is approaching. Since existing equipment such as a dashcam can be used as the camera, cost increase can be restrained.

The control unit may also analyze the image to detect a person other than a user associated with the vehicle. When the user associated with the vehicle is registered in advance, it is possible to determine whether or not the person present around the vehicle is an authorized user by analyzing the image.

The control unit may also open the window when a difference between the temperatures inside and outside the vehicle is equal to or more than a prescribed temperature difference. The prescribed temperature difference may be set in advance as a temperature difference that makes the temperature inside the vehicle more comfortable by opening the window. When the window is opened when the difference between the temperatures inside and outside the vehicle is equal to or more than the prescribed temperature difference, it is possible to restrain the window from being opened more than necessary. Therefore, it is possible to restrain a third party from entering the vehicle.

The control unit may also generate a command to give a notification to the inside or the outside of the vehicle when opening or closing the window. For example, the notification may be made by an alarm that notifies opening or closing of the window or made by voice that calls attention. The notification allows a person around the vehicle to be aware of the opening or closing of the window, which can restrain the person from touching the window during opening or closing. As a result, safety can be enhanced.

The control unit may also acquire the position information on the vehicle and set the opening degree of the window in accordance with the position information. For example, when the vehicle is in a garage at home, it is unlikely that a third party enters the vehicle. Therefore, ventilation can be promoted by increasing the opening degree of the window. On the other hand, in the case where, for example, the vehicle is parked in a parking lot other than at home, a third party can get close to the vehicle. Accordingly, reducing the opening degree of the window makes it possible to restrain the third party from entering the vehicle.

The control unit may also generate a command to open or close the window included in the vehicle based on the information about the temperature inside or outside the vehicle, when receiving a request to open or close the window from a user terminal associated with the vehicle. When the window is opened or closed in response to the request from the user, it is possible to restrain the window from being opened or closed more than necessary.

The system may also include a memory configured to store an opening degree of the window of the vehicle in accordance with the difference between the temperatures inside and outside the vehicle. This allows the opening degree of the window to be set to an appropriate opening degree in accordance with the difference between the temperatures inside and outside the vehicle.

Hereinafter, embodiments of the present disclosure will be described with reference to the drawings. The configurations of the following embodiments are merely illustrative, and the present disclosure is not limited to the configurations of the embodiments. The embodiments below may be combined as much as possible.

First Embodiment

FIG. 1 shows the schematic configuration of a system 1 according to the present embodiment. The system 1 is a system that allows a window 10A of a vehicle 10 to be opened and closed by remote operation. Opening or closing the window 10A by remote operation is executed, for example, when prescribed conditions are established. The opening or closing the window 10A by remote operation is executed based on the temperature inside or outside the vehicle.

In the example in FIG. 1, the system 1 includes the vehicle 10, a user terminal 20, and a center server 30. The user terminal 20 is a mobile terminal possessed by a user. The vehicle 10 is also associated with the user terminal 20. The vehicle 10, the user terminal 20, and the center server 30 are connected to each other through a network N1. As the network N1, a wide area network (WAN) that is a worldwide public communication network, such as the Internet, or other communication networks may be adopted, for example. The network N1 may also include telephone communication networks for cellular phones and the like, and wireless communication networks such as Wi-Fi (registered trademark). The vehicle 10 is further connected to the user terminal 20 via a network N2 including a short-distance radio communication network. FIG. 1 illustrates one vehicle 10 as an example. However, there may be two or more vehicles 10. There may also be two or more users and user terminals 20 according to the number of the vehicles 10.

Figure 2:
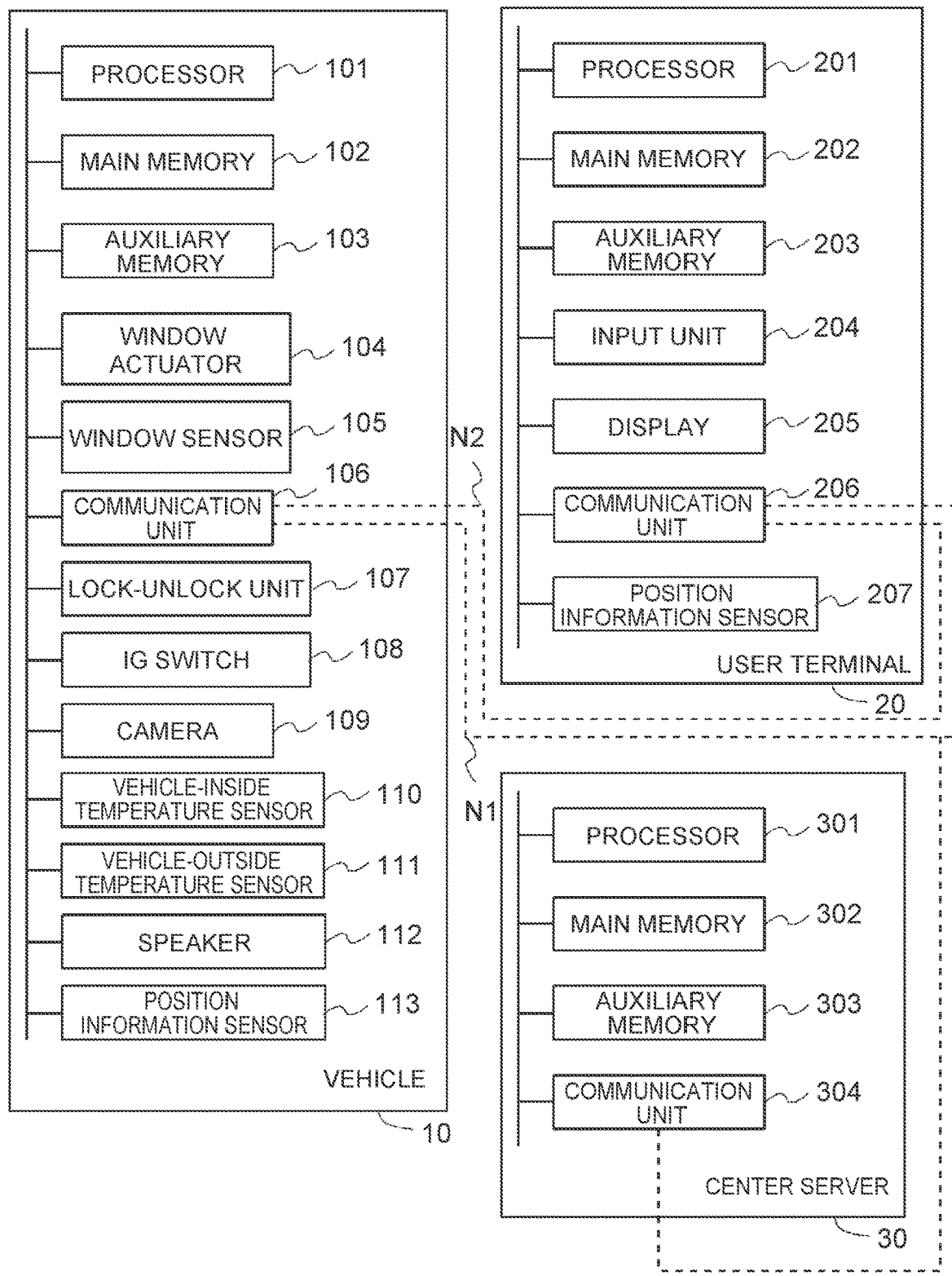
FIG. 2 is a block diagram schematically showing examples of the configuration of a vehicle, a user terminal, and a center server that constitute the system according to the embodiment.

With reference to FIG. 2, the hardware configuration and functional configuration of the vehicle 10, the user terminal 20, and the center server 30 will be described. FIG. 2 is a block diagram schematically showing examples of the configuration of the vehicle 10, the user terminal 20, and the center server 30 which constitute the system 1 according to the present embodiment.

The center server 30 has the configuration of a general computer. The center server 30 includes a processor 301, a main memory 302, an auxiliary memory 303, and a communication unit 304. These components are connected to each other via a bus.

The processor 301 is a central processing unit (CPU), a digital signal processor (DSP), or the like. The processor 301 controls the center server 30 and performs various information processing calculations. The main memory 302 is a random-access memory (RAM), a read-only memory (ROM), or the like. The auxiliary memory 303 is an erasable programmable ROM (EPROM), a hard disk drive (HDD), a removable medium, or the like. The auxiliary memory 303 stores an operating system (OS), various programs, various tables, and the like. The processor 301 loads the programs stored in the auxiliary memory 303 onto a work area of the main memory 302, and executes the programs therein. Each component member is controlled through execution of the programs. This enables the center server 30 to implement functions matched with prescribed purposes. The main memory 302 and the auxiliary memory 303 are computer-readable recording media. The center server 30 may be a single computer, or a combination of a plurality of computers. The information stored in the auxiliary memory 303 may be stored in the main memory 302. The information stored in the main memory 302 may be stored in the auxiliary memory 303. The processor 301 is an example of the control unit according to the present disclosure.

The communication unit 304 is means for communication with the vehicle 10 and the user terminal 20 via the network N1. The communication unit 304 is, for example, a local area network (LAN) interface board, or a wireless communication circuit for wireless communication. The LAN interface board or the wireless communication circuit is connected to the network N1.

Although a series of processing executed in the center server 30 can be executed by hardware, the processes can also be executed by software.

Description is now given of the user terminal 20. For example, the user terminal 20 is a small-size computer, such as a smartphone, a mobile phone, a tablet device, a personal information terminal, a wearable computer (such as a smart watch), or a personal computer (PC). The user terminal 20 includes a processor 201, a main memory 202, an auxiliary memory 203, an input unit 204, a display 205, a communication unit 206, and a position information sensor 207. These component members are connected to each other via a bus. Since the processor 201, the main memory 202, and the auxiliary memory 203 are similar to the processor 301, the main memory 302, and the auxiliary memory 303 of the center server 30, description thereof is omitted.

The input unit 204 is means for receiving input operation performed by the user. For example, the input unit 204 is a touch panel, a mouse, a keyboard, or a pushbutton. The display 205 is means for presenting information to the user. For example, the display 205 is a liquid crystal display (LCD) or an electroluminescent (EL) panel. The input unit 204 and the display 205 may be configured as a single touch screen display.

The communication unit 206 is communication means for connecting the user terminal 20 to the network N1 or the network N2. The communication unit 206 is a circuit for establishing communication with other devices (e.g., the vehicle 10, the center server 30, or the like) via the network N1 or the network N2 by using, for example, mobile communications services (e.g., telephone communication networks, such as 5th generation (5G), 4th generation (4G), 3rd generation (3G), and long term evolution (LTE)), and wireless communication networks such as Wi-Fi (registered trademark) and Bluetooth (registered trademark).

The position information sensor 207 acquires position information (e.g., latitude and longitude) on the user terminal 20. The position information sensor 207 is, for example, a global positioning system (GPS) receiver, a wireless LAN communication unit, or the like.

Description is now given of the vehicle 10. The vehicle 10 includes a processor 101, a main memory 102, an auxiliary memory 103, a window actuator 104, a window sensor 105, a communication unit 106, a lock-unlock unit 107, an IG switch 108, a camera 109, a vehicle-inside temperature sensor 110, a vehicle-outside temperature sensor 111, a speaker 112, and a position information sensor 113. These component members are connected to each other via a bus. Since the processor 101, the main memory 102, the auxiliary memory 103, the communication unit 106, and the position information sensor 113 are similar to the processor 201, the main memory 202, the auxiliary memory 203, the communication unit 206, and the position information sensor 207 of the user terminal 20, the description thereof is omitted.

The window actuator 104, which is an actuator for opening and closing a window glass, is typically an electric motor. The window sensor 105 is configured to detect the opening degree of the window glass. The window sensor 105 may be configured to detect that the opening degree of the window glass is a prescribed degree. For example, the window sensor 105 may be able to detect whether the window is fully closed or not.

The lock-unlock unit 107 locks and unlocks a door of the vehicle 10. The IG switch 108 is a switch that is pressed by the user to start the vehicle 10 or to deactivate the vehicle 10. The camera 109 takes images using an image element, such as a charge coupled device (CCD) image sensor or a complementary metal oxide semiconductor (CMOS) image sensor. The images obtained by photographing may be still images or video images. The camera 109 is provided inside the vehicle and arranged to photograph the outside of the vehicle from the inside.

The vehicle-inside temperature sensor 110 is a detection sensor to detect temperature inside the vehicle 10. For example, the vehicle-inside temperature sensor 110 outputs a signal in accordance with the temperature inside the vehicle. The vehicle-outside temperature sensor 111 is a detection sensor to detect temperature outside the vehicle 10. For example, the vehicle-outside temperature sensor 111 outputs a signal in accordance with the temperature outside the vehicle. For example, the speaker 112 is a device that outputs voice or alarm to the outside of the vehicle 10.

Figure 3:
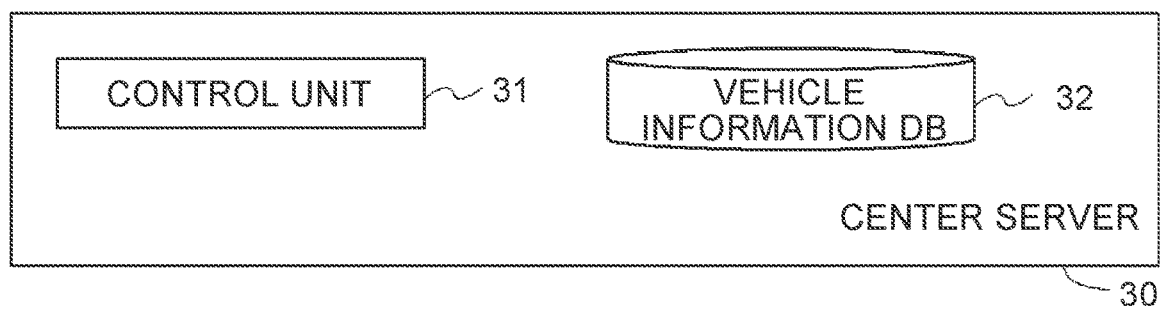
FIG. 3 illustrates functional configuration of the center server.

Description is now given of the function of the center server 30. FIG. 3 illustrates the functional configuration of the center server 30. The center server 30 includes a control unit 31 and a vehicle information DB 32 as functional component members. The processor 301 of the center server 30 executes the processing of the control unit 31 according to computer programs on the main memory 302.

The vehicle information DB 32 is constructed when the program of a database management system (DBMS) executed by the processor 301 manages the data stored in the auxiliary memory 303. The vehicle information DB 32 is a relational database, for example.

Some of the processing of the control unit 31 may be executed by other computers connected to the network N1.

The control unit 31 acquires information about the vehicle 10 (hereinafter also referred to as vehicle information). The vehicle information is used to associate the vehicle 10 with the user terminal 20. The vehicle information includes a vehicle ID that is an identifier unique to each of the vehicles 10, a user ID that is an identifier unique to each user, and a user terminal ID that is an identifier unique to each of the user terminals 20. These pieces of information are registered in advance in the center server 30 by the user using the user terminal 20. When the vehicle information is acquired, the control unit 31 stores the acquired information in the vehicle information DB 32.

The control unit 31 opens and closes the window 10A of the vehicle 10 by remote operation when the vehicle 10 is in a parked state. Therefore, the control unit 31 determines whether or not prescribed conditions are established. For example, the prescribed conditions include that the vehicle 10 is in a function stop state (shutdown state) and that the user is away from the vehicle 10. In such a state, it can be said that the vehicle 10 is in a parked state. The control unit 31 uses the function of a smart key 11A described later to determine whether or not an electronic key 21A described later is present inside the vehicle. When the electronic key 21A is not present in the vehicle, it is assumed that the user has left the vehicle 10 by carrying the electronic key 21A. The control unit 31 also acquires an activation status of the vehicle 10. Specifically, when the user presses the IG switch 108, whether or not the vehicle 10 is shut down is acquired. When the vehicle 10 is in the parked state, it is unlikely that the user drives the vehicle 10 immediately.

The control unit 31 determines whether or not the prescribed conditions are established based on the detection status of the electronic key 21A and the activation status of the vehicle 10 transmitted from the vehicle 10. Specifically, it is determined that the prescribed conditions are established when the vehicle 10 detects the electronic key 21A and the vehicle 10 is in the function stop state (shutdown state). The detection status of the electronic key 21A and the activation status of the vehicle 10 may be transmitted at regular intervals from the vehicle 10, or may be transmitted when the detection status of the electronic key 21A or the activation status of the vehicle 10 changes.

In the present embodiment, whether or not the prescribed conditions are established is determined based on the detection status of the electronic key 21A and the activation status of the vehicle 10. However, the prescribed conditions are not limited to these. For example, the detection status of the electronic key 21A may be replaced with a door lock status. Specifically, it is possible to determine that the prescribed conditions are established when the door of the vehicle 10 is locked from the outside and the vehicle 10 is in the shutdown state. For example, when the vehicle 10 is shut down, and the door is opened and closed once, it can be considered that the driver has left the vehicle 10. Therefore, in that case, it is possible to determine that the prescribed conditions are established.

The control unit 31 also acquires a window opening degree at the present time from the vehicle 10 in response to a request from the user terminal 20. The window opening degree is information indicating the opening degree of the window 10A. For example, when the window 10A is fully opened, the window opening degree is 100%. When the window 10A is fully closed, the window opening degree is 0%. For example, the window opening degree may gradually increase in proportion to a movement distance of the window glass when the window glass moves from a fully closed state to a fully opened state. Alternatively, the window opening degree may be set in accordance with the opening area. The window opening degree can be detected by the window sensor 105. The control unit 31 receives a request (hereinafter referred to as a present status confirmation request) to confirm the window opening degree at the present moment from the user terminal 20. Upon reception of the present status confirmation request, the control unit 31 transmits to the vehicle 10 a command requesting transmission of a detection value of the window sensor 105, a detection status of the electronic key 21A, a detection value of the camera 109, an activation status of the vehicle 10, a detection value of the vehicle-inside temperature sensor 110, and a detection value of the vehicle-outside temperature sensor 111.

The control unit 31 receives the detection value of the window sensor 105, the detection status of the electronic key 21A, the detection value of the camera 109, the activation status of the vehicle 10, the detection value of the vehicle-inside temperature sensor 110, and the detection value of the vehicle-outside temperature sensor 111 from the vehicle 10 that has responded to the command. The control unit 31 may transfer this information to the user terminal 20.

When the control unit 31 receives a request to open or close the window 10A from the user terminal 20, the control unit 31 determines the opening degree of the window 10A based on the temperature inside or outside the vehicle, and transmits to the vehicle 10 a command to achieve the determined opening degree. For example, the control unit 31 determines the opening degree of the window 10A based on a difference between the temperature inside the vehicle and the temperature outside the vehicle. In this case, as the difference between the temperature inside the vehicle and the temperature outside the vehicle is larger, the opening degree of the window 10A may be set to be larger. Here, as the opening degree of the window 10A is larger, ventilation can be performed faster, so that the temperature inside the vehicle can be adjusted faster. However, as the opening degree of the window 10A becomes larger, a third party can more easily enter the vehicle. Therefore, the opening degree of the window 10A is minimized to restrain the third party from entering the vehicle.

For example, when there is little difference between the temperature inside the vehicle and the temperature outside the vehicle, opening the window 10A may hardly change the temperature inside the vehicle. Therefore, the control unit 31 may open the window 10A when the difference between the temperature inside the vehicle and the temperature outside the vehicle is equal to or more than a prescribed temperature difference.

Figure 4:
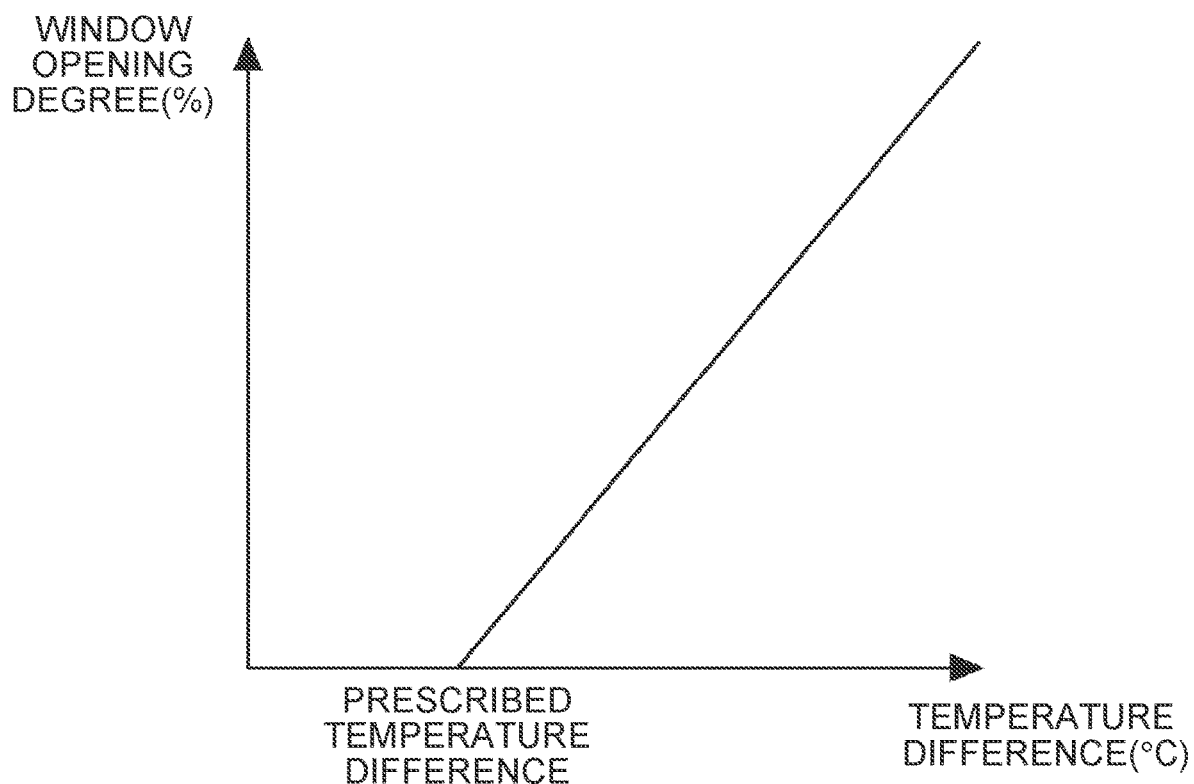
FIG. 4 shows an example of the relationship between a difference between temperature inside the vehicle and temperature outside the vehicle and a window opening degree.

The relationship between the temperatures inside and outside the vehicle and the window opening degree may be stored in advance in the auxiliary memory 303. FIG. 4 shows an example of the relationship between a difference between temperature inside the vehicle and the temperature outside the vehicle and the window opening degree. In the example shown in FIG. 4, the window opening degree is made larger as the temperature difference is larger in the case where the temperature difference is equal to or more than the prescribed temperature difference. On the other hand, when the temperature difference is less than the prescribed temperature difference, the window opening degree is zero.

Figure 5:
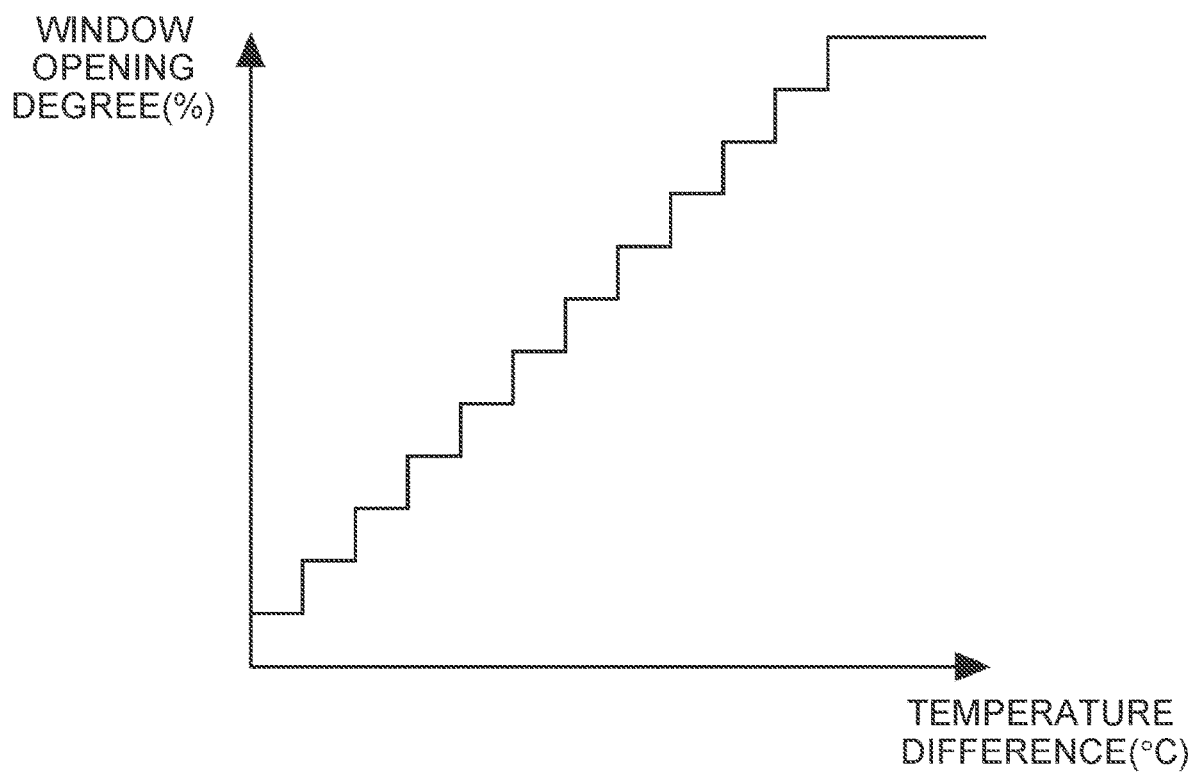
FIG. 5 shows another example of the relationship between the difference between temperature inside the vehicle and temperature outside the vehicle and the window opening degree.

FIG. 5 shows another example of the relationship between the difference between the temperature inside the vehicle and the temperature outside the vehicle and the window opening degree. In the example shown in FIG. 5, the window opening degree is increased stepwise as the temperature difference is larger. The window opening degree may be changed in two levels: 0% and 100%. The relationship shown in FIG. 4 or 5 is stored in the auxiliary memory 303 in advance.

When the control unit 31 receives a request to open or close the window 10A from the user terminal 20, the control unit 31 may request the user terminal 20 to enter a password or a PIN code to verify that the request is from the authorized user.

When the window opening degree is determined, the control unit 31 generates a command to open or close the window 10A and transmits the command to the vehicle 10. The command to open or close the window 10A is generated to operate the window actuator 104 so as to achieve the determined window opening degree. When opening or closing of the window 10A is completed in the vehicle 10, the vehicle 10 transmits a completion report. Upon reception of the completion report from the vehicle 10, the control unit 31 generates a command to display the report regarding the completion of opening or closing of the window 10A on the display 205 of the user terminal 20, and transmits the command to the user terminal 20.

The control unit 31 also receives the output of the camera 109 from the vehicle 10 after transmitting the command to open or close the window 10A to the vehicle 10. The control unit 31 then determines whether or not there is a third party around the vehicle 10 based on the output of the camera 109. When determination is made that there is a third party around the vehicle 10, the control unit 31 generates a command to reduce the window opening degree and transmits the command to the vehicle 10. In this case, the window opening degree may be set to prevent hands from entering into the vehicle through the window 10A, or the window 10A may be set to be fully closed. At this time, the control unit 31 may also generate information indicating that the window opening degree is changed, and transmit the information to the user terminal 20. The information may include information used to inform the user that a third party is present around the vehicle 10.

When the person around the vehicle 10 is the authorized user, there is no need to change the window opening degree. Therefore, whether the person is the authorized user or not may be determined by, for example, registering a face image of the user in the vehicle information DB 32 in advance, and comparing the image taken with the camera 109 with the face image of the user. Alternatively, the detection status of the electronic key 21A is acquired from the vehicle 10, and when the electronic key 21A is detected by the vehicle 10, it can be determined that the person around the vehicle 10 is the authorized user.

Figure 6:
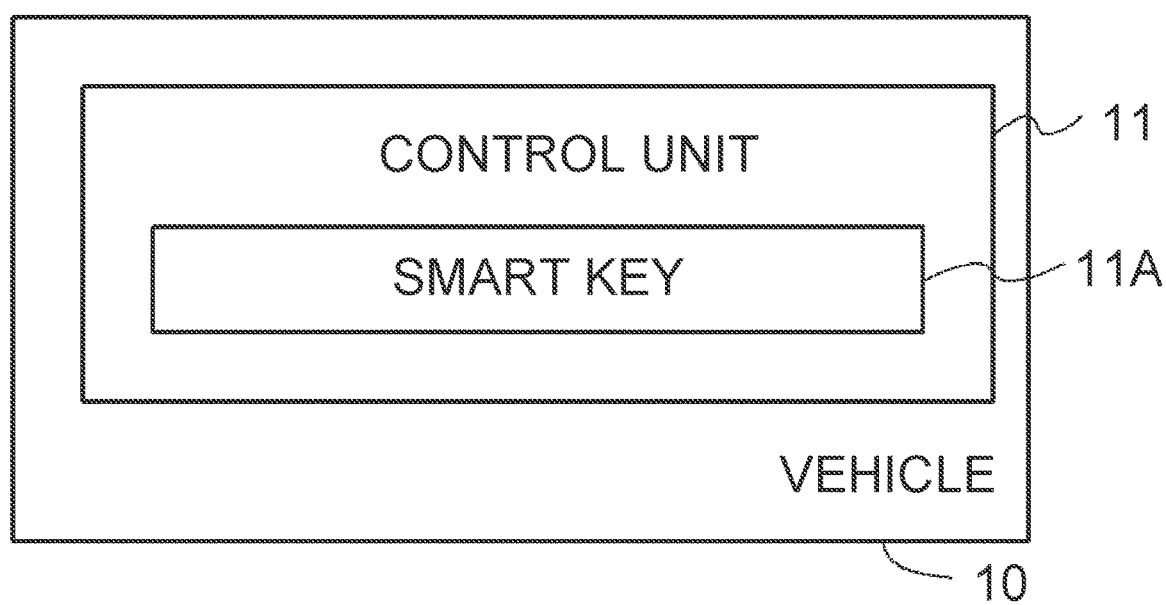
FIG. 6 illustrates functional configuration of the vehicle.

Description is now given of the function of the vehicle 10. FIG. 6 illustrates the functional configuration of the vehicle 10. The vehicle 10 includes a control unit 11 as a functional component member. The processor 101 of the vehicle 10 executes the processing of the control unit 11 according to computer programs on the main memory 102. However, some of the processing of the control unit 11 may be executed by a hardware circuit.

The control unit 11 has the function of the smart key 11A for locking and unlocking the door by operating the lock-unlock unit 107 based on a signal from the user terminal 20. The control unit 11 uses the function of the smart key 11A to perform short-distance radio communication with the electronic key 21A described later. The control unit 11 also transmits, for example, information regarding whether the smart key 11A can communicate with the electronic key 21A or information regarding the intensity of the electric wave from the electronic key 21A to the center server 30 as the detection status of the electronic key 21A.

The control unit 11 transmits the detection value of the window sensor 105, the detection status of the electronic key 21A, the detection value of the camera 109, the activation status of the vehicle 10, the detection value of the vehicle-inside temperature sensor 110, and the detection value of the vehicle-outside temperature sensor 111 to the center server 30 at prescribed intervals. These pieces of information may be transmitted only when the information, such as the detection values, are changed. The transmission of the information may be performed in response to the request from the center server 30.

The detected value of the window sensor 105 is information regarding whether the window is open or not, or information regarding the window opening degree. The detection status of the electronic key 21A indicates the status of communication between the smart key 11A and the electronic key 21A, which can be used to determine whether the user with the electronic key 21A is present in the vehicle or around the vehicle 10. The detected value of the camera 109 is information that can be used to determine whether or not there is a person around the vehicle 10. The activation status of the vehicle 10 is information that can be used to determine whether or not the vehicle 10 is activated or in the function stop state. The activation status of the vehicle 10 changes by the user pressing the IG switch 108, for example. The detection value of the vehicle-inside temperature sensor 110 is information that can be used to determine the temperature inside the vehicle 10. The detection value of the vehicle-outside temperature sensor 111 is information that can be used to determine the temperature outside the vehicle 10. The detection value of the vehicle-inside temperature sensor 110 and the detection value of the vehicle-outside temperature sensor 111 are information that can be used to determine a temperature difference between the inside and the outside of the vehicle 10.

When the control unit 31 receives a command from the center server 30 via the communication unit 106, the control unit 31 executes the processing in response to the command. When the control unit 11 receives a command to open or close the window 10A from the center server 30, the control unit 11 operates the window actuator 104 to open or close the window 10A. In this instance, the control unit 11 operates the window actuator 104 until the opening degree of the window 10A detected by the window sensor 105 becomes the opening degree according to the command.

The control unit 11 also transmits the detection value of the camera 109 to the center server 30 after activating the window actuator 104 based on the command from the center server 30. The detection value of the camera 109 may be transmitted to the center server 30 at each prescribed time, or be transmitted to the center server 30 when the detection value changes. When the control unit 11 receives the command to open or close the window 10A from the center server 30 after transmitting the detection value of the camera 109 to the center server 30, the control unit 11 operates the window actuator 104. In this instance, the control unit 11 also operates the window actuator 104 until the opening degree of the window 10A detected by the window sensor 105 becomes the opening degree corresponding to the command. The control unit 11 may also notify the change of the window opening degree to the center server 30 when the window opening degree is changed.

Figure 7:
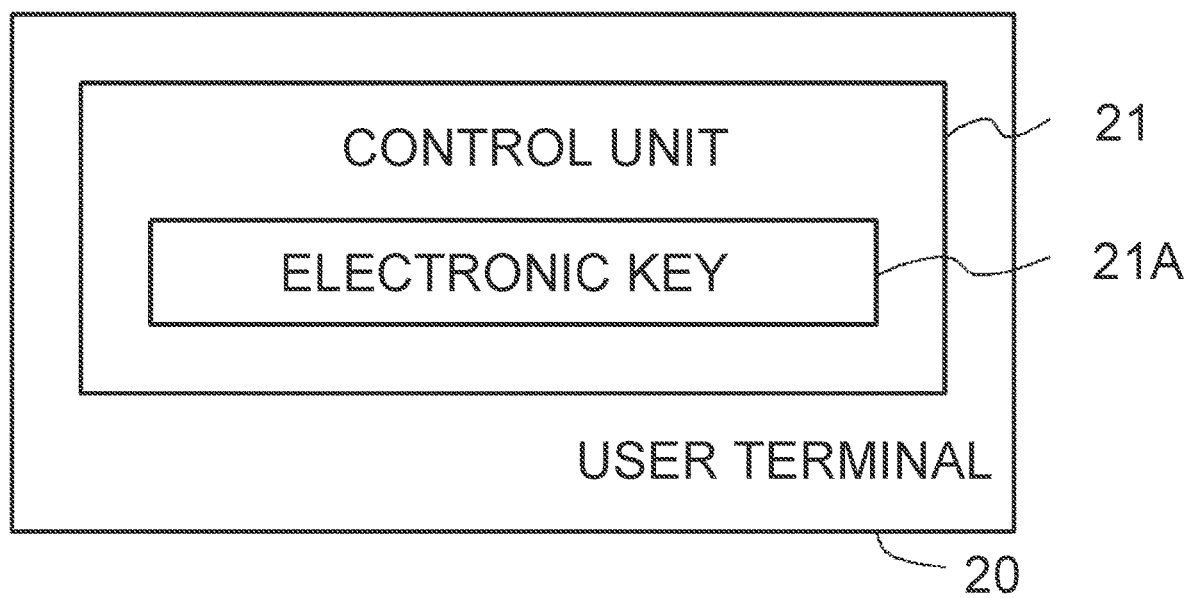
FIG. 7 illustrates functional configuration of the user terminal.

Description is now given of the function of the user terminal 20. FIG. 7 illustrates the functional configuration of the user terminal 20. The user terminal 20 includes a control unit 21 as a functional component member. The processor 201 of the user terminal 20 executes the processing of the control unit 21 according to computer programs on the main memory 202. However, some of the processing of the control unit 21 may be executed by a hardware circuit. The control unit 21 includes the function of the electronic key 21A of a smart key system. Alternatively, the user may have a terminal with an electronic key function separately from the user terminal 20. The control unit 21 (electronic key 21A) establishes communication with the smart key 11A of the vehicle 10 to lock and unlock the vehicle 10.

The control unit 21 also transmits a present status confirmation request to the center server 30. In the case where, for example, there is an input into the input unit 204 to activate application software to perform ventilation inside the vehicle (e.g., in the case where the icon of the application software displayed on the display 205 is tapped), the control unit 21 transmits to the center server 30 the present status confirmation request that is a request to confirm the status of the vehicle 10.

Figure 8:
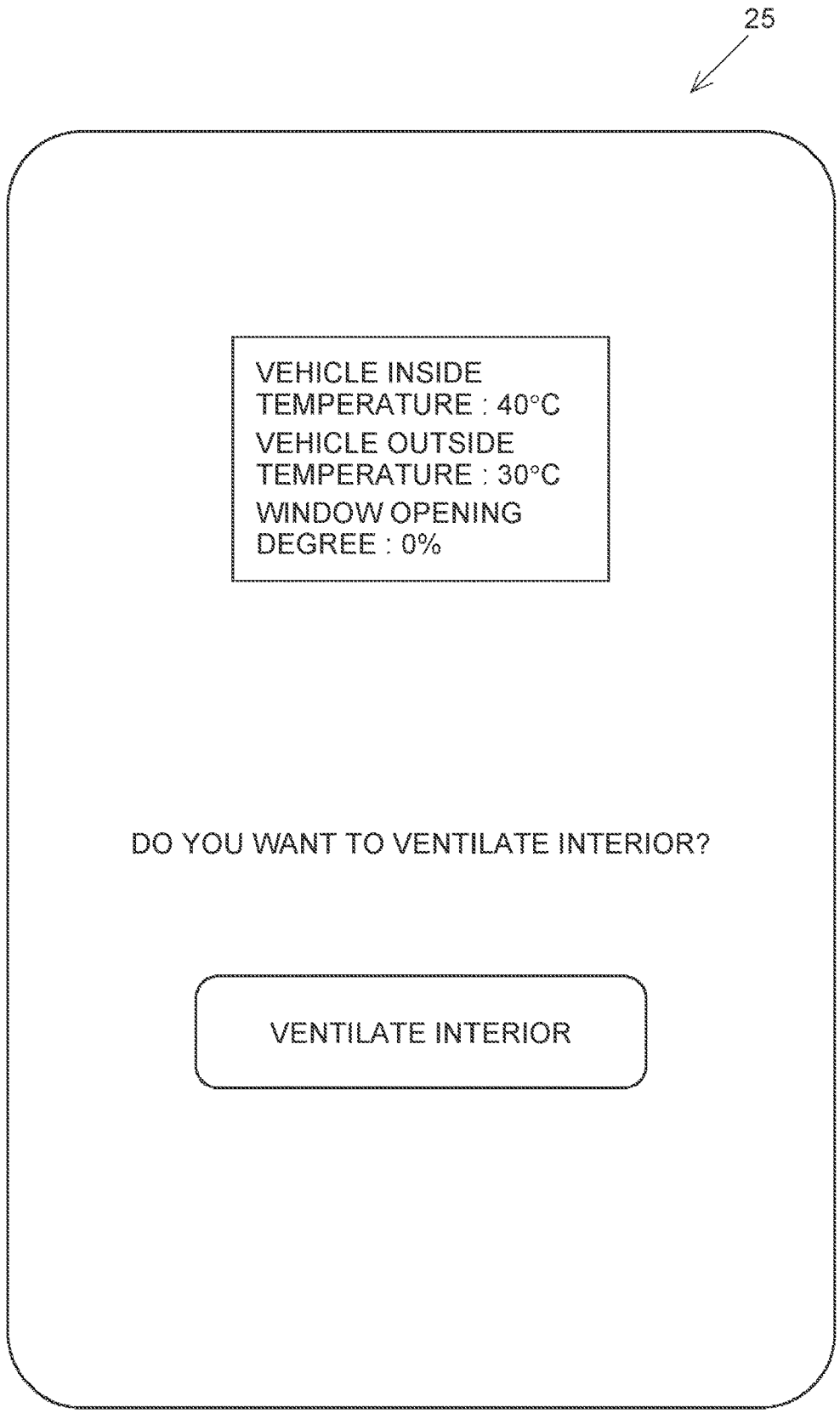
FIG. 8 shows an example of an image displayed on a display in accordance with the state of the vehicle.

When the control unit 21 receives information about the status of the vehicle 10 from the center server 30, the control unit 21 displays an image corresponding to the status of the vehicle 10 on the display 205. For example, the temperature outside the vehicle, the temperature inside the vehicle, and the opening degree of the window 10A are displayed on the display 205. FIG. 8 shows an example of an image displayed on the display 205 in accordance with the status of the vehicle 10. Here, the display is made to indicate the temperature outside the vehicle, the temperature inside the vehicle, and the opening degree of the window 10A. A message "do you want to ventilate the interior?" is also displayed together with a button stating "Ventilate interior". When the user taps the button "Ventilate interior", the control unit 21 displays on the display 205 an image to request entry of the PIN code, for example.

Figure 9:
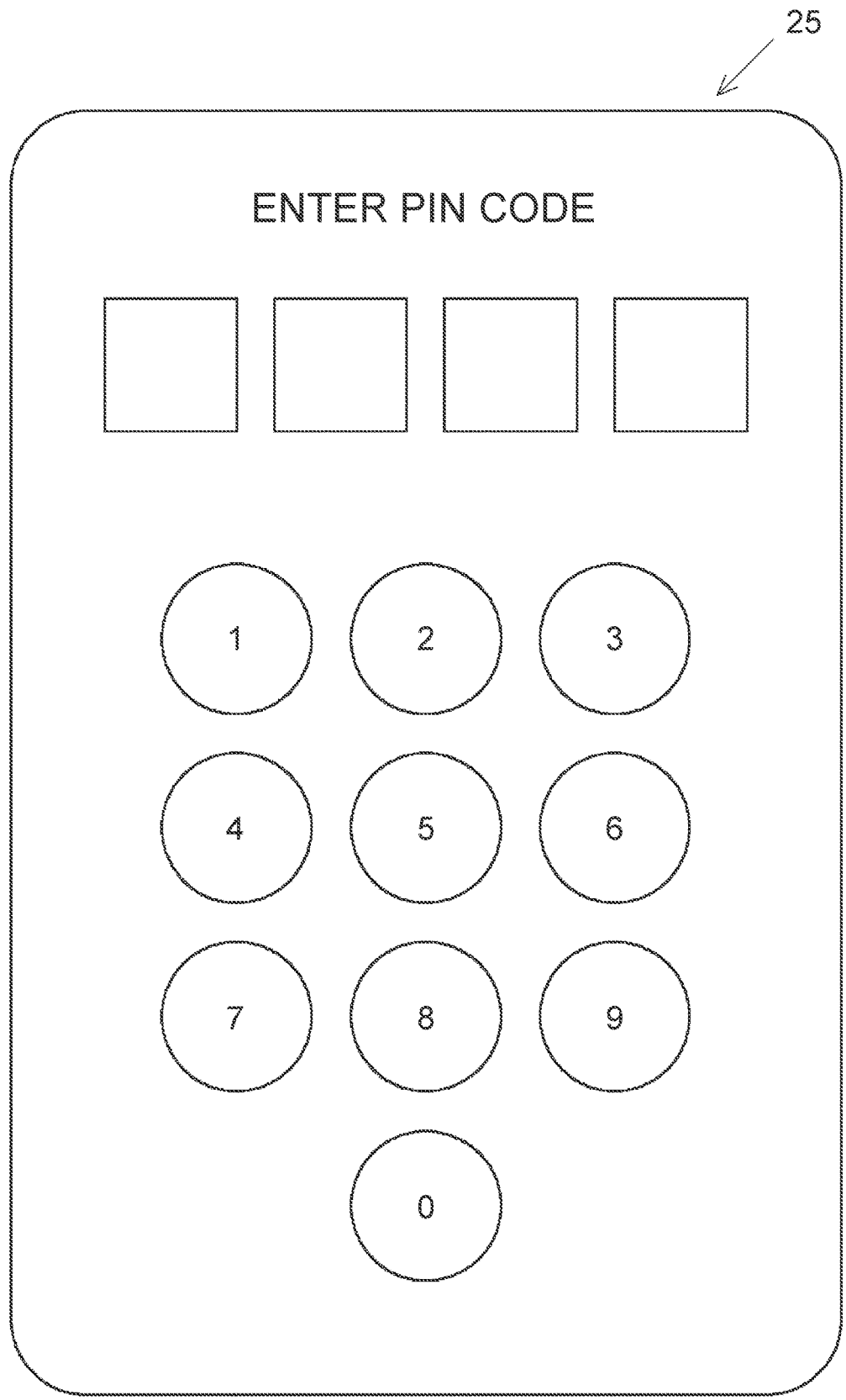
FIG. 9 shows an example of an image that requests entry of a PIN code.

FIG. 9 shows an example of an image that requests entry of the PIN code. The user enters the PIN code by tapping the buttons indicating the numbers corresponding to the PIN code. When the user enters the PIN code, the control unit 21 transmits the PIN code to the center server 30. Once the center server 30 authenticates the PIN code, the control unit 21 receives information about PIN code authentication from the center server 30. Alternatively, the control unit 21 may perform authentication. In this case, the control unit 21 receives from the center server 30 the information necessary for authentication in advance.

Figure 10:
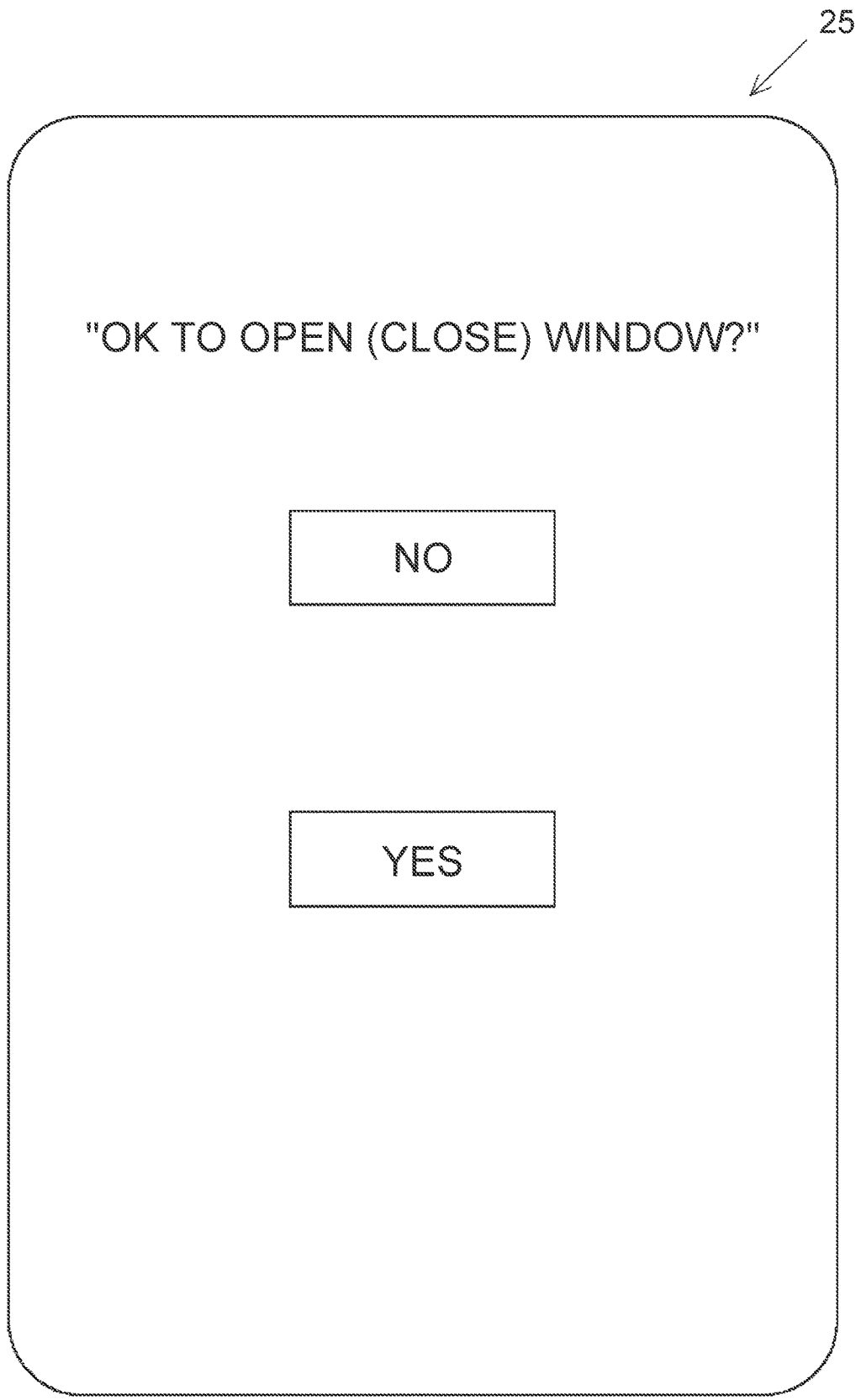
FIG. 10 shows an example of an operation confirmation image.

Upon reception of the information about the PIN code authentication, the control unit 21 displays an operation confirmation image on the display 205. FIG. 10 shows an example of the operation confirmation image. The image is displayed for the user to make final confirmation regarding opening or closing of the window 10A. For example, a message "OK to open (close) window?" is displayed together with buttons "YES" and "NO". When the user taps the "YES" button, the control unit 21 transmits information about the request to open or close the window 10A to the center server 30. When the user presses the "NO" button, the control unit 21 displays the image shown in FIG. 8.

Figure 11:
FIG. 11 shows an example of a completion image.

When opening or closing the window 10A is completed in the vehicle 10, the vehicle 10 transmits a completion report from the center server 30 to the user terminal 20. Upon reception of the completion report, the control unit 21 displays a completion image on the display 205. FIG. 11 shows an example of the completion image. For example, a message "Window is opened" and the "OK" button are displayed. When the user taps the "OK" button, the control unit 21 displays on the display 205 an image indicating the opening degree of the window 10A at the present moment, for example.

Figure 12:
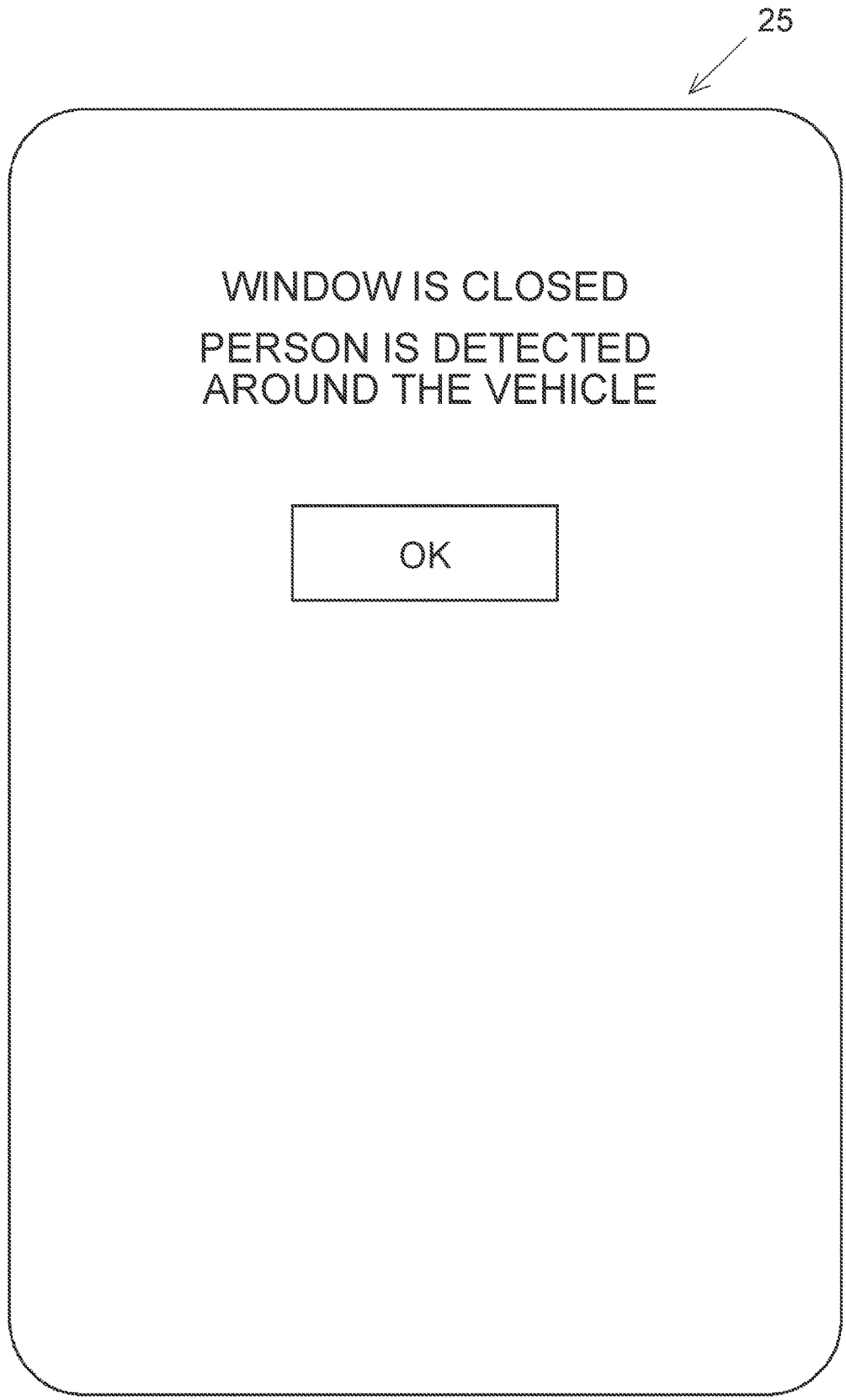
FIG. 12 shows an example of an image displayed when the window is closed.

Meanwhile, when a person is detected around the vehicle 10 when the window 10A is opened for ventilation, the control unit 21 informs the user that the window 10A is closed. FIG. 12 shows an example of an image displayed when the window 10A is closed. For example, a message stating "Window is closed. Person is detected around the vehicle" and the "OK" button are displayed. When the user taps the "OK" button, the control unit 21 displays the image shown in FIG. 8, for example.

Figure 13:
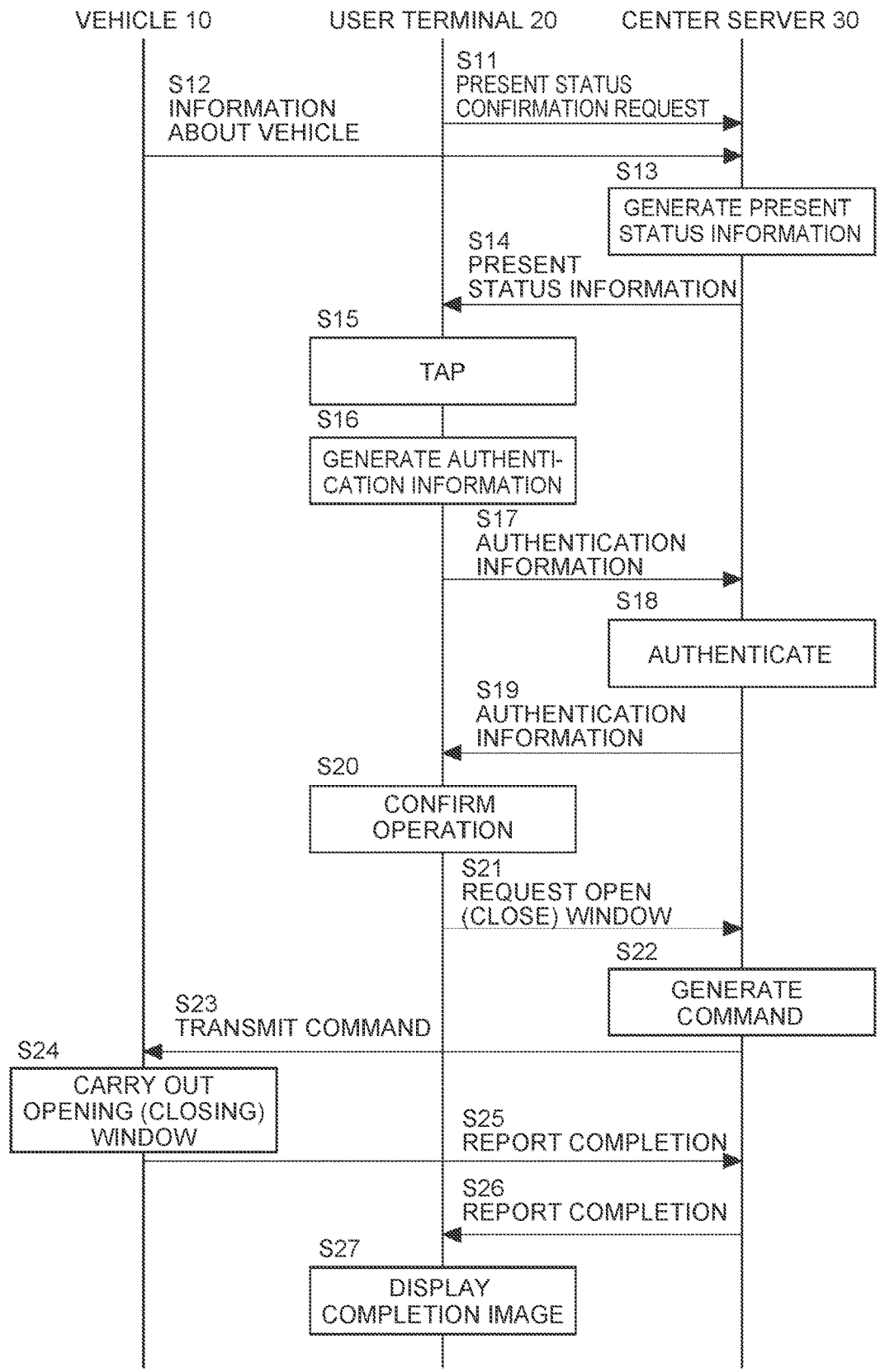
FIG. 13 is a sequence diagram showing entire processing of the system.

Description is now given of the entire processing of the system 1. FIG. 13 is a sequence diagram showing the entire processing of the system 1. The vehicle 10 and the user terminal 20 shown in FIG. 13 are associated with each other in advance and registered in the center server 30. When the user starts prescribed application software on the user terminal 20, a present status confirmation request is transmitted from the user terminal 20 to the center server 30 (S11). Information about the vehicle 10 is also transmitted from the vehicle 10 to the center server 30 at each prescribed time (S12). The information about the vehicle 10 stated herein includes the detection value of the window sensor 105, the detection status of the electronic key 21A, the detection value of the camera 109, the activation status of the vehicle 10, the detection value of the vehicle-inside temperature sensor 110, and the detection value of the vehicle-outside temperature sensor 111. In FIG. 13, the information about the vehicle 10 is transmitted from the vehicle 10 to the center server 30 at each prescribed time. Alternatively, in response to a request from the center server 30 that has received the present status confirmation request from the user terminal 20, the vehicle 10 may transmit the information about the vehicle 10 to the center server 30.

The center server 30 generates present status information based on the information about the vehicle 10 (S13), and transmits the information to the user terminal 20 (S14). The current status information includes information about the temperature inside the vehicle, the temperature outside the vehicle, and the window status at the present moment. When the user taps the button on the screen in FIG. 8, which is displayed on the display 205 of the user terminal 20 (S15), the user terminal 20 requests the user to enter the PIN code. When the PIN code is entered, authentication information is generated (S16), and the generated authentication information is transmitted to the center server 30 (S17). Upon reception of the authentication information, the center server 30 performs authentication by PIN code matching (S18). When the user is authenticated, information about completion of authentication is transmitted from the center server 30 to the user terminal 20 (S19).

In the user terminal 20, an image is displayed to confirm with the user about whether to open or close the window 10A (S20). When the user taps the "YES" button on the screen in FIG. 10, a request to open or close the window 10A is transmitted from the user terminal 20 to the center server 30 (S21). Upon reception of the request, the center server 30 generates a command to open or close the window 10A (S22), and transmits the command to the vehicle 10 (S23).

Upon reception of the command, the vehicle 10 carries out opening or closing of the window 10A (S24). In the vehicle 10, the window actuator 104 is operated to carry out opening or closing of the window 10A. When opening or closing of the window 10A is completed, a completion report is transmitted from the vehicle 10 to the center server 30 (S25). The completion report is transferred from the center server 30 to the user terminal 20 (S26). Upon reception of the completion report, the user terminal 20 displays on the display 205 an image indicating that opening or closing of the window 10A is completed (S27).

Figure 14:
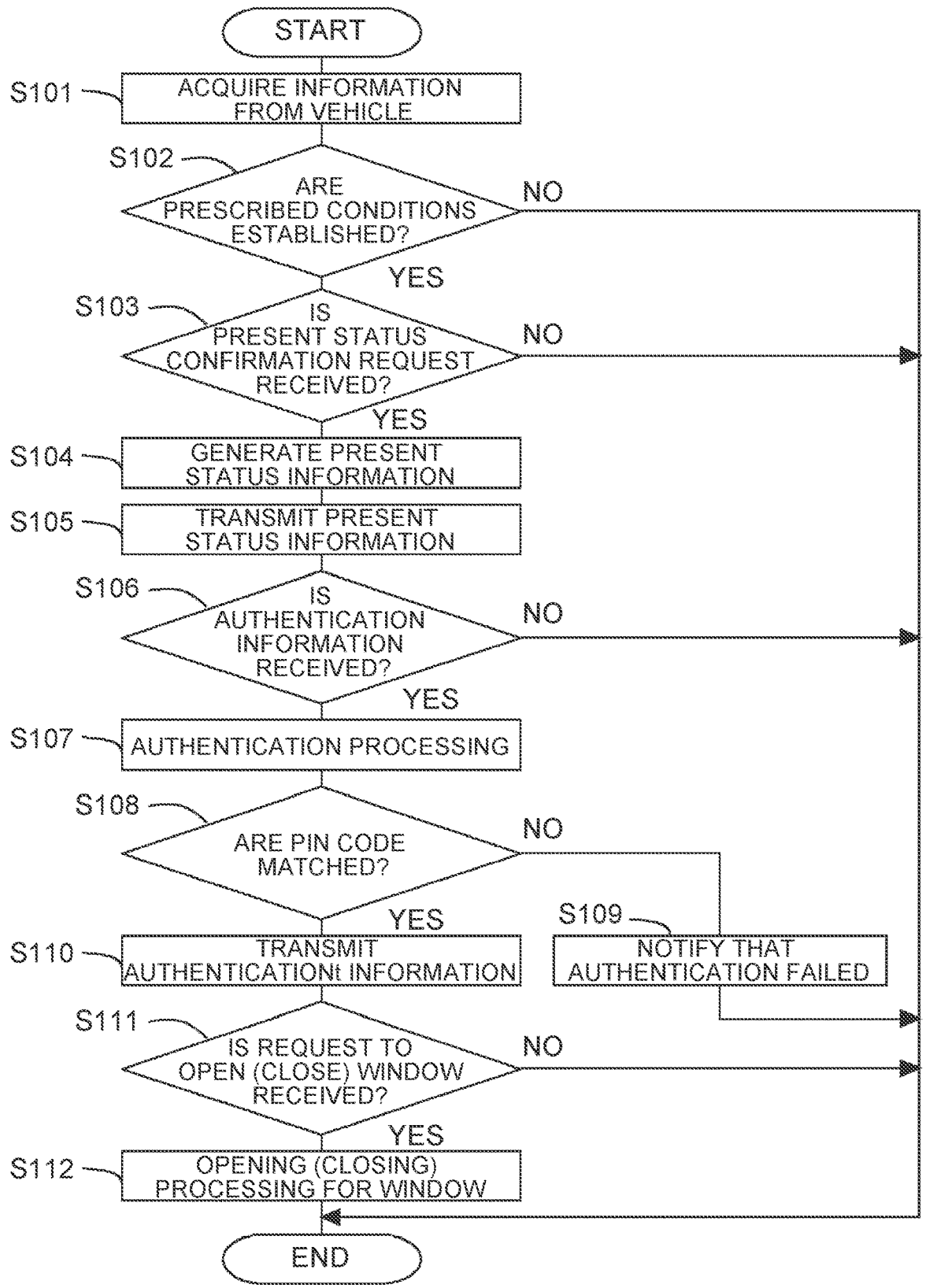
FIG. 14 is a flowchart of processing of the center server according to the embodiment.

Description is now given of the processing of the center server 30. FIG. 14 is a flowchart of the processing of the center server 30 according to the present embodiment. The processing shown in FIG. 14 is repeatedly executed for each of the vehicles 10 at each prescribed time. Note that description will be given on the assumption that necessary information is already stored in the vehicle information DB 32.

In step S101, the control unit 31 acquires information from the vehicle 10. The information acquired at the time includes the detection value of the window sensor 105, the detection status of the electronic key 21A, the detection value of the camera 109, the activation status of the vehicle 10, the detection value of the vehicle-inside temperature sensor 110, and the detection value of the vehicle-outside temperature sensor 111.

In step S102, the control unit 31 determines whether or not prescribed conditions are established. For example, the control unit 31 determines that the prescribed conditions are established when the vehicle 10 is shut down and communication between the electronic key 21A and the smart key 11A is not established. When positive determination is made in step S102, the processing proceeds to step S103. When negative determination is made, the present routine is ended.

In step S103, the control unit 31 determines whether or not the present status confirmation request is received from the user terminal 20. When positive determination is made in step S103, the processing proceeds to step S104. When negative determination is made, the present routine is ended.

In step S104, the control unit 31 generates present status information. The present status information includes information about the temperature inside the vehicle, the temperature outside the vehicle, and the window opening degree. In step S105, the control unit 31 transmits the present status information to the user terminal 20.

In step S106, the control unit 31 determines whether or not authentication information is received from the user terminal 20. When positive determination is made in step S106, the processing proceeds to step S107. When negative determination is made, the present routine is ended. When the control unit 31 does not receive the authentication information from the user terminal 20 for prescribed time, negative determination may be made.

In step S107, the control unit 31 carries out authentication processing. The control unit 31 compares the PIN code entered in the user terminal 20 by the user with the PIN code registered in advance in the auxiliary memory 303. In step S108, the control unit 31 determines whether or not the PIN codes are matched. When positive determination is made in step S108, the processing proceeds to step S110. When negative determination is made, the processing proceeds to step S109.

In step S109, the control unit 31 notifies that authentication failed to the user terminal 20. The notification may include information for displaying authentication failure on the display 205 of the user terminal 20. Meanwhile, in step S110, the control unit 31 transmits authentication information indicating authentication success to the user terminal 20.

In step S111, the control unit 31 determines whether or not a request to open or close the window 10A is received from the user terminal 20. The request to open or close the window 10A is transmitted from the user terminal 20 when final confirmation about opening or closing of the window 10A is made in the user terminal 20. When the request to open or close the window 10A is not received from the user terminal 20 after waiting for a certain amount of time, negative determination is made. When positive determination is made in step S111, the processing proceeds to step S112 to execute the opening or closing processing of the window 10A. The opening and closing processing of the window 10A will be described later. Meanwhile, when negative determination is made in step S111, the present routine is ended.

Figure 15:
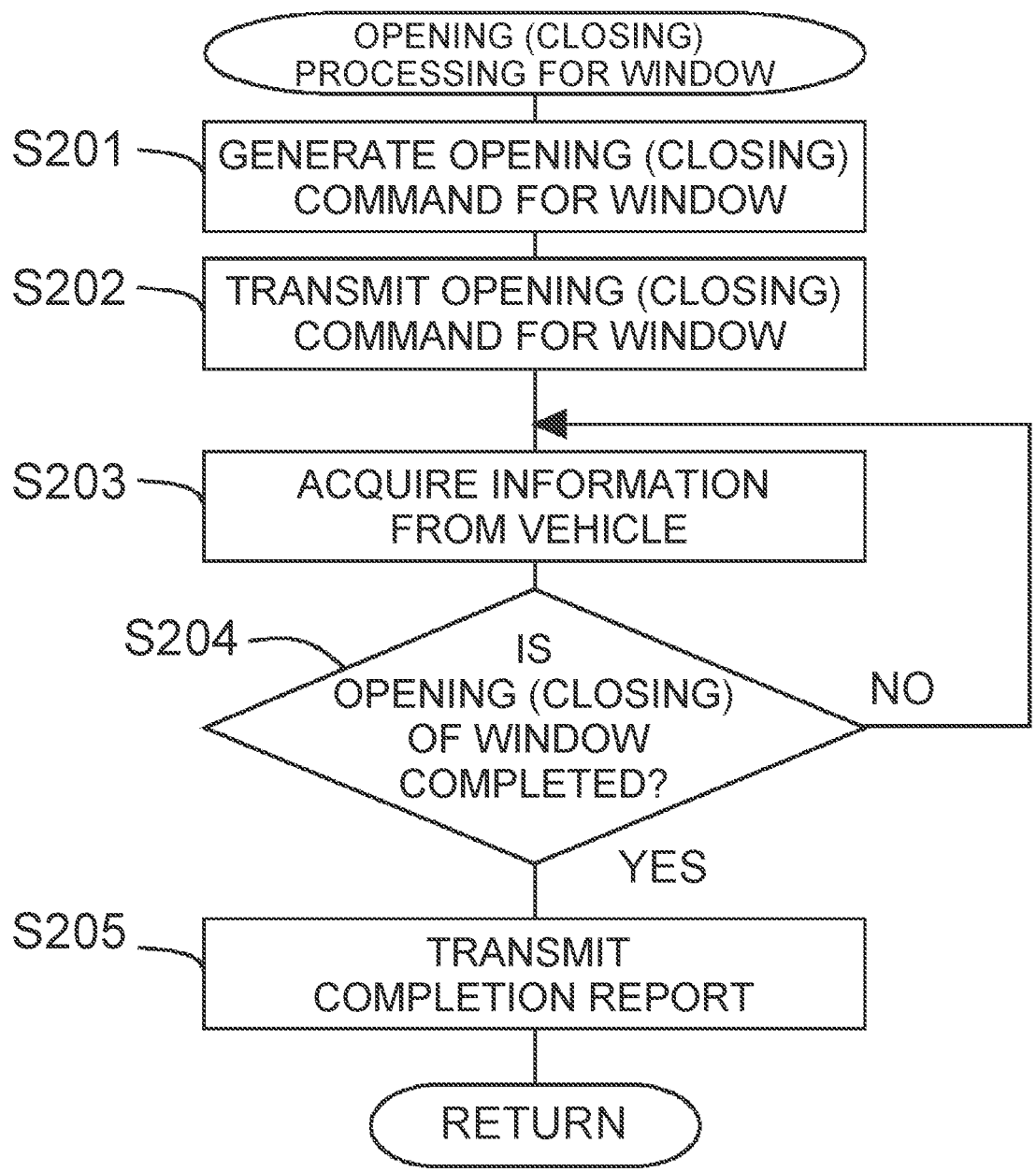
FIG. 15 is a flowchart of opening and closing processing for a window executed in step S112 in FIG. 14.

FIG. 15 is a flowchart of the opening and closing processing for the window 10A executed in step S112 in FIG. 14. In step S201, the control unit 31 generates an opening or closing command for the window 10A. The opening or closing command for the window 10A, which is a command to carry out the opening or closing of the window 10A, includes information about the opening degree of the window 10A. The control unit 31 determines the opening degree of the window 10A based on the difference between the temperature inside the vehicle and the temperature outside the vehicle, and the information stored in the auxiliary memory 303. The opening or closing command for the window 10A includes a command for making a notification from the speaker 112 during opening or closing of the window 10A in response to the opening or closing of the window 10A. In step S202, the control unit 31 transmits an opening or closing command for the window 10A to the vehicle 10.

In step S203, the control unit 31 acquires information from the vehicle 10. The information acquired in this case includes the detected value of the window sensor 105 or a completion report. In step S204, the control unit 31 determines whether or not opening or closing of the window 10A is being carried out in the vehicle 10. For example, when the completion report is not received from the vehicle 10, the control unit 31 determines that opening or closing of the window 10A is being carried out. Alternatively, the control unit 31 may determine that opening or closing of the window 10A is being carried out when the window opening degree at the present moment is not the opening degree in response to the command transmitted in step S202. When positive determination is made in step S204, the processing proceeds to step S205. When negative determination is made, the present routine is returned to step S203.

In step S205, the control unit 31 transmits the completion report to the user terminal 20. The completion report is transmitted so as to display the completion image on the display 205 of the user terminal 20. The completion image is the image shown in FIG. 11, the image indicating that opening or closing of the window 10A is completed.

Figure 16:
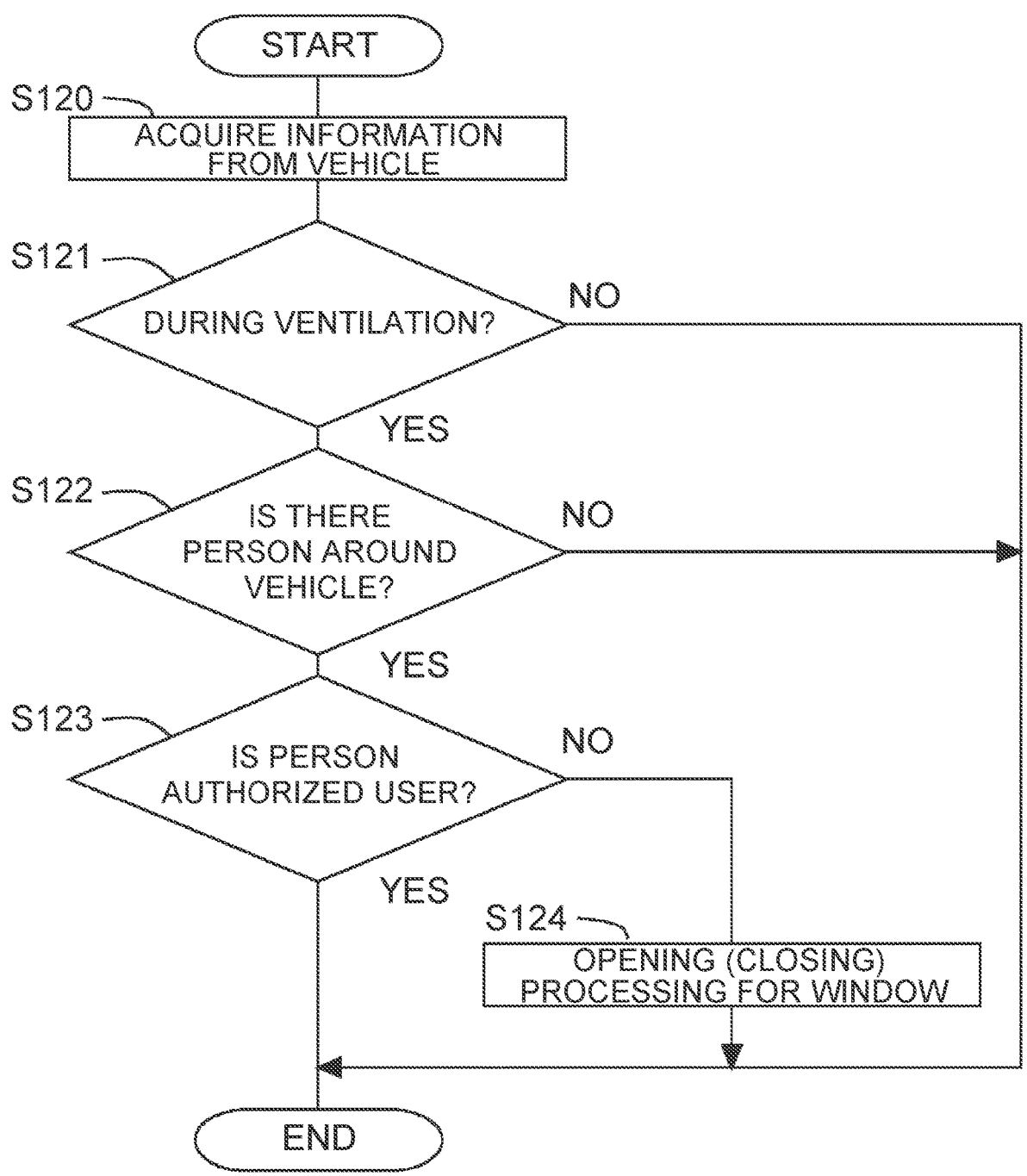
FIG. 16 is a flowchart of processing to reduce the window opening degree during ventilation.

The control unit 31 also carries out processing to reduce the window opening degree when a third party is detected around the vehicle 10 while the window 10A of the vehicle 10 is open for ventilation. FIG. 16 is a flowchart of the processing to reduce the window opening degree during ventilation. The present routine is executed for each of the vehicles 10 at each prescribed time.

In step S120, the control unit 31 acquires information from the vehicle 10. Here, as in step S101, the information is acquired from the vehicle 10. In step S121, the control unit 31 determines whether or not the vehicle 10 is being ventilated. For example, when the window opening degree is larger than 0%, the control unit 31 determines that the vehicle 10 is being ventilated. Alternatively, the control unit 31 may determine that the vehicle 10 is being ventilated after the window 10A is opened according to the routine shown in FIG. 15. When positive determination is made in step S121, the processing proceeds to step S122. When negative determination is made, the present routine is ended.

In step S122, the control unit 31 determines whether or not there is a person around the vehicle 10. The control unit 31 determines whether or not there is a person around the vehicle 10 by analyzing the image taken with the camera 109. When positive determination is made in step S122, the processing proceeds to step S123. When negative determination is made, the present routine is ended.

In step S123, the control unit 31 determines whether the person present around the vehicle 10 is an authorized user. For example, the control unit 31 determines whether or not the person present around the vehicle 10 is an authorized user by comparing the image of the authorized user stored in the auxiliary memory 303 with the image taken with the camera 109. When the person is an authorized user, it is not needed to reduce the window opening degree. Alternatively, when the electronic key 21A is detected by the vehicle 10, the control unit 31 may determine that the person around the vehicle 10 is the authorized user. When positive determination is made in step S123, the present routine is ended. When negative determination is made, the processing proceeds to step S124.

In step S124, as in step S112, the opening and closing processing for the window 10A is executed. In short, the control unit 31 executes the routine shown in FIG. 15. Here, in step S201, the control unit 31 generates the opening or closing command for the window 10A such that a changed window opening degree becomes smaller than the window opening degree at the present moment. In this case, for example, the control unit 31 may generate an opening or closing command to set the window opening degree to be small enough to prevent hands of a person from entering into the vehicle or may generate an opening or closing command to set the window 10A to be fully closed. In step S205, the control unit 31 transmits the completion report so as to display the image shown in FIG. 12 on the display 205.

Note that the control unit 31 may return the window opening degree to its original degree when no third party is detected around the vehicle 10 after the window opening degree is reduced by the processing in step S124.

Figure 17:
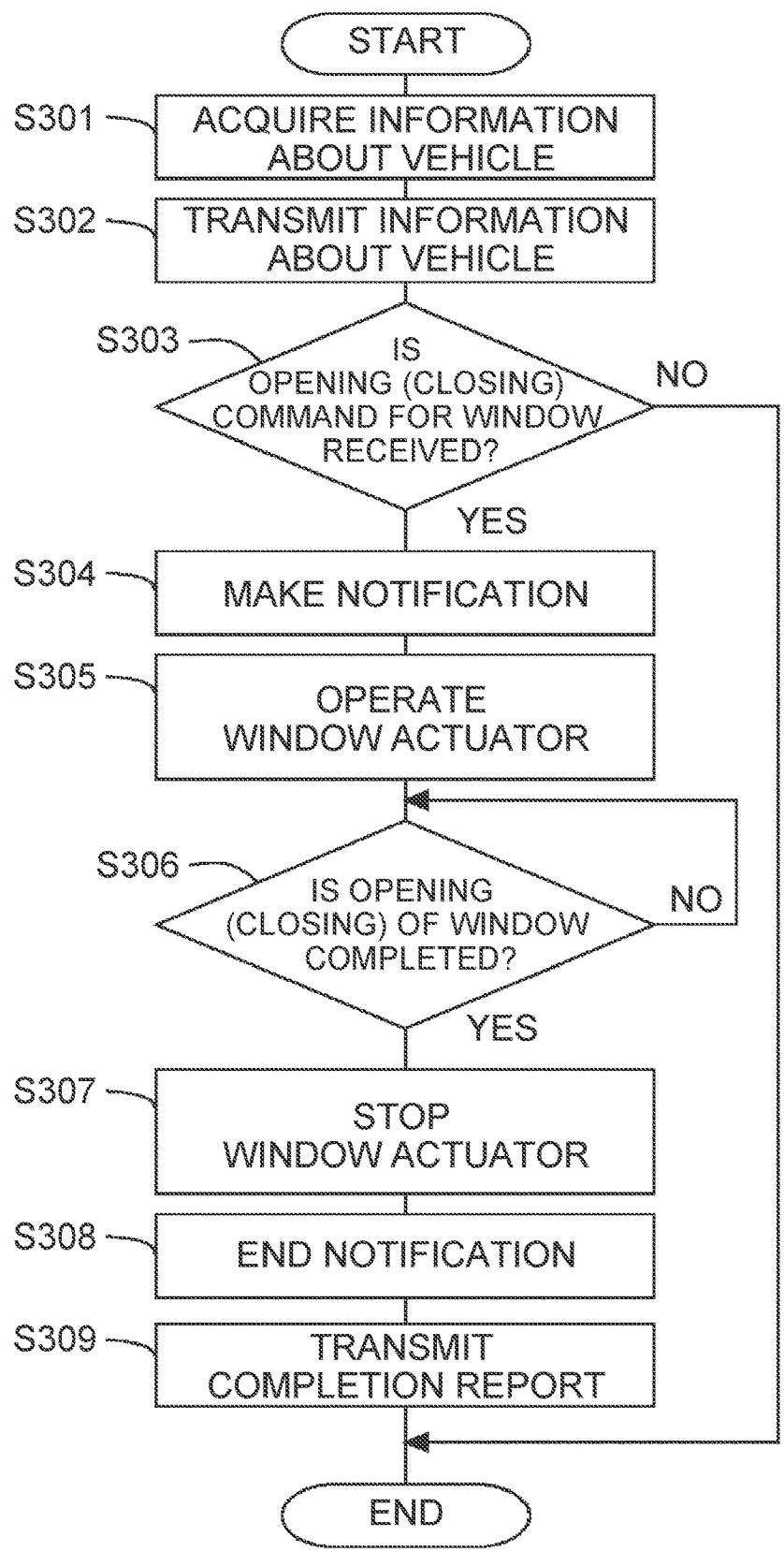
FIG. 17 is a flowchart of processing of the vehicle according to the embodiment.

Description is now given of the processing of the vehicle 10. FIG. 17 is a flowchart of the processing of the vehicle 10 according to the present embodiment. The processing shown in FIG. 17 is repeatedly executed for each of the vehicles 10 at each prescribed time.

In step S301, the control unit 11 acquires information about the vehicle 10. The information acquired here corresponds to the information that the center server 30 receives in step S101 in FIG. 14. Specifically, the control unit 11 acquires the detection value of the window sensor 105, the detection status of the electronic key 21A, the detection value of the camera 109, the activation status of the vehicle 10, the detection value of the vehicle-inside temperature sensor 110, and the detection value of the vehicle-outside temperature sensor 111.

In step S302, the control unit 11 transmits the acquired information about the vehicle 10 to the center server 30. In step S303, the control unit 11 determines whether or not an opening or closing command for the window 10A is received from the center server 30. The opening or closing command for the window 10A is transmitted from the center server 30 in step S202 in FIG. 15. When positive determination is made in step S303, the processing proceeds to step S304. When negative determination is made, the present routine is ended. In step S304, the control unit 11 makes a notification about the opening or closing of the window 10A via the speaker 112. The notification may continuously be made until the opening or closing of the window 10A is completed, or may be made before the window 10A is opened or closed.

In step S305, the control unit 11 operates the window actuator 104 so as to operate the window 10A. In step S306, the control unit 11 determines whether or not opening or closing of the window 10A is completed. In other words, the control unit 11 determines whether or not the window opening degree included in the opening or closing command for the window 10A is equal to the window opening degree at the present moment. When positive determination is made in step S306, the processing proceeds to step S307. When negative determination is made, the processing of step S306 is executed again.

In step S307, the control unit 11 stops the window actuator 104. In step S308, the control unit 11 ends notification. Then, in step S309, the control unit 11 transmits the completion report to the center server 30. The completion report is information indicating that opening or closing of the window 10A is completed. The center server 30 receives the completion report in step S203 in FIG. 15.

Figure 18:
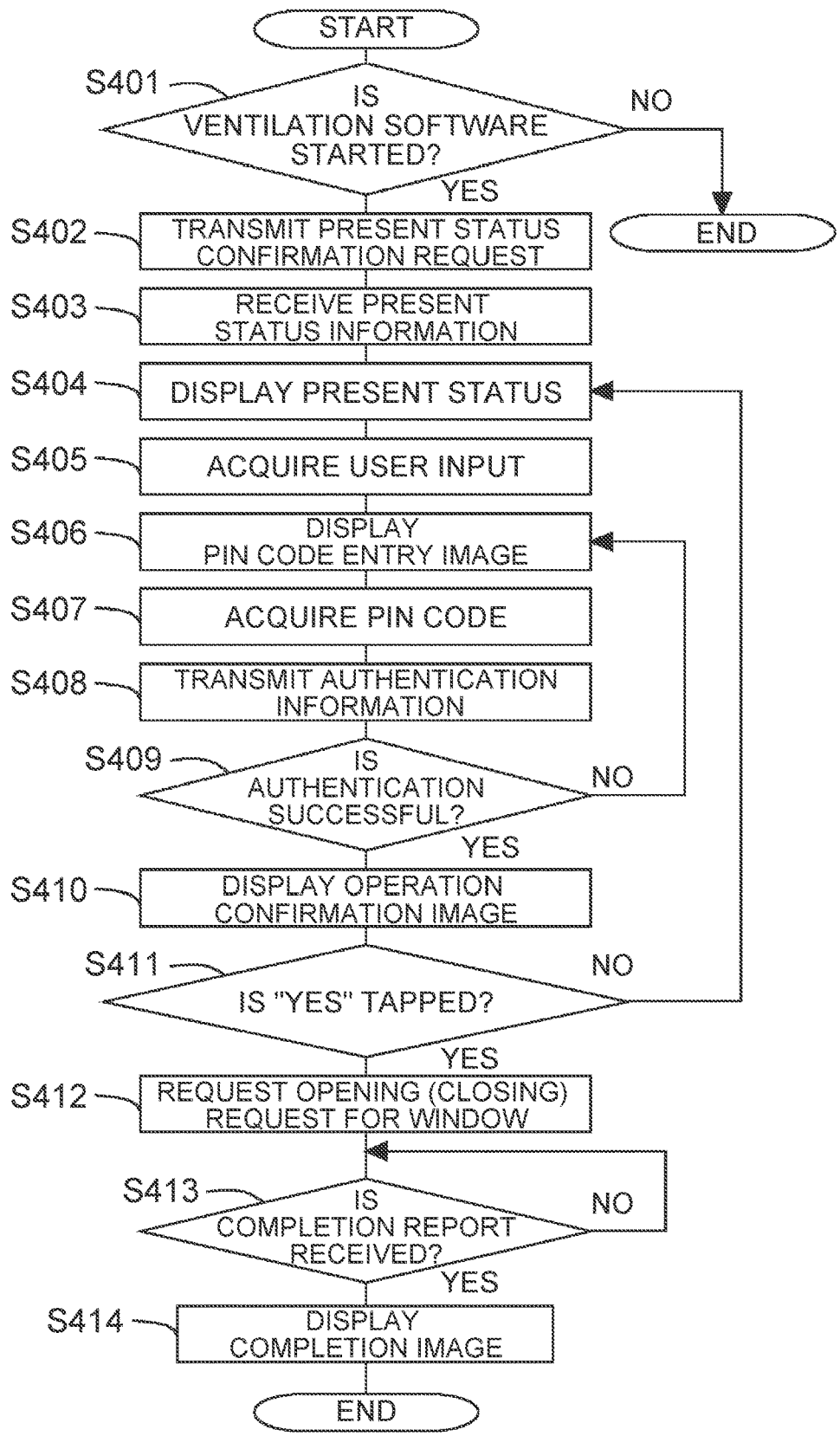
FIG. 18 is a flowchart of processing of the user terminal according to the embodiment.

Description is now given of the processing of the user terminal 20. FIG. 18 is a flowchart of the processing of the user terminal 20 according to the present embodiment. The processing shown in FIG. 18 is repeatedly executed in the user terminal 20 at each prescribed time.

In step S401, the control unit 21 determines whether or not the user starts application software for ventilating the vehicle 10. When the user taps the prescribed icon displayed on the display 205, the application software for ventilating the vehicle 10 is started. When positive determination is made in step S401, the processing proceeds to step S402. When negative determination is made, the present routine is ended.

In step S402, the control unit 21 transmits a present status confirmation request to the center server 30. The request is associated with identification information on the user terminal 20. In step S403, the control unit 21 receives present status information from the center server 30. In this case, the control unit 21 receives the present status information transmitted from the center server 30 in step S105 in FIG. 14. In step S404, the control unit 21 displays an image corresponding to the present status on the display 205. The control unit 21 displays an image corresponding to the window opening degree, the temperature inside the vehicle, and the temperature outside the vehicle at the present moment on the display 205 as shown in FIG. 8.

In step S405, the control unit 21 acquires user input. Here, the control unit 21 acquires the information indicating that the user taps the "ventilate interior" button shown in FIG. 8. In step S406, the control unit 21 displays an image to request the user to enter the PIN code on the display 205. In this case, the image shown in FIG. 9 is displayed. Then, in step S407, the control unit 21 acquires the PIN code entered by the user.

In step S408, the control unit 21 transmits authentication information including the PIN code to the center server 30. The authentication information is associated with the identification information on the user terminal 20. The center server 30 receives the authentication information in step S106 in FIG. 14. In step S409, the control unit 21 determines whether or not authentication is successful. When the authentication information is transmitted from the center server 30 in step S110 in FIG. 14, positive determination is made in step S409. Meanwhile, when information indicating authentication failure is transmitted from the center server 30 in step S109 in FIG. 14, negative determination is made in step S409. When positive determination is made in step S409, the processing proceeds to step S410. When negative determination is made, the processing returns to step S406. The control unit 21 may display information indicating authentication failure on the display 205 before returning to step S406.

In step S410, the control unit 21 displays an operation confirmation image on the display 205. In this case, the control unit 21 displays the image shown in FIG. 9 on the display 205. In step S411, the control unit 21 determines whether or not the user taps the "YES" button. When positive determination is made in step S411, the processing proceeds to step S412. When negative determination is made, the processing returns to step S404.

In step S412, the control unit 21 transmits an opening or closing request for the window 10A to the center server 30. The opening or closing request for the window 10A transmitted at the time is received by the center server 30 in step S111 in FIG. 14. In step S413, the control unit 21 determines whether or not the completion report is received from the center server 30. The completion report is the information transmitted from the center server 30 in step S205 in FIG. 15. When positive determination is made in step S413, the processing proceeds to step S414. When negative determination is made, the processing of step S413 is executed again. In step S414, the control unit 21 displays a completion image on the display 205. The completion image is the image shown in FIG. 11.

As described in the foregoing, according to the present embodiment, it is possible to ventilate the vehicle 10 by remote operation. By setting the opening degree of the window 10A at the time to a minimum required opening degree, it is possible to restrain a third party from entering the vehicle 10 while promoting ventilation. Moreover, when a third party approaches the vehicle 10 while the window 10A is open, the opening degree of the window 10A is reduced. This makes it possible to restrain the third party from entering the vehicle 10.

Second Embodiment

In the present embodiment, the opening degree of the window 10A during ventilation is adjusted according to a parking position. Other hardware and software configurations are the same as those in the first embodiment. Here, in the case where the vehicle 10 is parked in a garage at home, for example, it is unlikely that a third party enters the vehicle even when the window 10A is open. On the other hand, when the window 10A is left open in a crowded area, there is a possibility of a third party entering the vehicle. Therefore, in the present embodiment, when the vehicle 10 is parked in a location registered in advance, the opening degree of the window 10A is made larger than when the vehicle 10 is parked in unregistered locations. The user registers in the center server 30 the location where a large window opening degree is set via the user terminal 20.

For example, in the case of determining the opening degree of the window 10A in accordance with the difference between the temperature inside the vehicle and the temperature outside the vehicle, the window opening degree when the vehicle is parked at home may be made larger than when the vehicle is parked at locations other than at home. Alternatively, when the vehicle is parked at home, for example, the window opening degree is set to maximum regardless of the difference between the temperature inside the vehicle and the temperature outside the vehicle, and when the vehicle is parked at locations other than at home, the window opening degree may be determined in accordance with the difference between the temperature inside the vehicle and the temperature outside the vehicle.

For example, the window opening degree in the case of parking the vehicle at home and the window opening degree in the case of parking the vehicle at locations other than at home may be stored in the auxiliary memory 303. Alternatively, the window opening degree in the case of parking the vehicle at home is stored in the auxiliary memory 303, and the window opening degree in the case of parking the vehicle at locations other than at home may be calculated by multiplying the window opening degree stored in the auxiliary memory 303 by a predetermined coefficient. In this case, the predetermined coefficient is a value equal to or more than zero and less than one.

For example, when the control unit 31 of the center server 30 receives information from the vehicle 10 in step S101 in FIG. 14, the control unit 31 also acquires position information on the vehicle 10. For example, when the control unit 11 of the vehicle 10 acquires information on the vehicle 10 in step S301 in FIG. 17, the control unit 11 includes the detection value of the position information sensor 113 in the information. Specifically, in step S301, the control unit 11 acquires the detection value of the window sensor 105, the detection status of the electronic key 21A, the detection value of the camera 109, the activation status of the vehicle 10, the detection value of the vehicle-inside temperature sensor 110, the detection value of the vehicle-outside temperature sensor 111, and the detection value of the position information sensor 113. Then, in step S302, the control unit 11 transmits the information on the vehicle 10 to the center server 30.

In this way, it is possible to restrain a third party from entering into the vehicle 10 during ventilation.

Other Embodiments

The embodiments disclosed are merely exemplary, and the present disclosure can suitably be changed without departing from the scope of the present disclosure.

The processing or means described in the present disclosure can freely be combined and implemented without departing from the range of technical consistency.

The processing described to be performed by one device may be executed by a plurality of devices in cooperation with each other. Alternatively, the processing described to be executed by different devices may be executed by one device. In the computer system, hardware configuration (server configuration) that implements each function may flexibly be changed. For example, the vehicle 10 may have some or all of the functions of the center server 30.

The present disclosure can also be implemented when a computer program, mounted with the functions described in the embodiments, is supplied to a computer, and one or more processors included in the computer read and execute the program. Such a computer program may be provided to the computer by a non-transitory computer readable storage medium that is connectable to a system bus of the computer, or may be provided to the computer through a network. Examples of the non-transitory computer readable storage medium include a disk or disc of any types, including magnetic disks (such as floppy (registered trademark) disks, and hard disk drives (HDDs)) and optical discs (such as CD-ROMs, DVD discs, and Blu-ray discs), and a read-only memory (ROM), a random-access memory (RAM), an EPROM, an EEPROM, a magnetic card, a flash memory, an optical card, or a medium of any types suitable for storing electronic commands.

What is claimed is:

1. An information processing device, comprising a control unit configured to execute:
    acquiring information about a temperature inside or outside a vehicle;
    acquiring position information of the vehicle; and
    generating a command to open or close a window included in the vehicle based on the information about the temperature inside or outside the vehicle,
    wherein an opening degree of the window is set in accordance with the position information of the vehicle, so that when the vehicle is parked in a previously registered location the opening degree of the window is set to be larger than when the vehicle is parked in an unregistered location.

2. The information processing device according to claim 1, wherein the control unit is configured to generate a command to fully close the window when a person is detected within a prescribed distance from the vehicle.

3. The information processing device according to claim 2, wherein the control unit is configured to generate the command to fully close the window only when a person who does not possess an electronic key of the vehicle is detected within the prescribed distance from the vehicle.

4. The information processing device according to claim 2, wherein the control unit is configured to detect the person based on an image taken with a camera included in the vehicle.

5. The information processing device according to claim 4, wherein the control unit is configured to analyze the image to detect a person other than a user associated with the vehicle.

6. The information processing device according to claim 1, wherein the control unit is configured to open the window when a difference between the temperatures inside and outside the vehicle is equal to or more than a prescribed temperature difference.

7. The information processing device according to claim 1, wherein the control unit is configured to generate a command to give a notification to an inside or an outside of the vehicle when opening or closing the window.

8. The information processing device according to claim 1, wherein the control unit is configured to generate a command to open or close the window included in the vehicle based on the information about the temperature inside or outside the vehicle, when receiving a request to open or close the window from a user terminal associated with the vehicle.

9. The information processing device according to claim 1, comprising a memory configured to store the opening degree of the window of the vehicle in accordance with a difference between the temperatures inside and outside the vehicle.

10. An information processing method, comprising a computer executing:
    acquiring information about a temperature inside or outside a vehicle; and
    acquiring position information of the vehicle;
    generating a command to open or close a window included in the vehicle based on the information about the temperature inside or outside the vehicle,
    wherein an opening degree of the window is set in accordance with the position information of the vehicle, so that when the vehicle is parked in a previously registered location the opening degree of the window is set to be larger than when the vehicle is parked in an unregistered location.

11. The information processing method according to claim 10, wherein the computer generates a command to fully close the window when a person is detected within a prescribed distance from the vehicle.

12. The information processing method according to claim 11, wherein the computer generates the command to fully close the window only when a person who does not possess an electronic key of the vehicle is detected within the prescribed distance from the vehicle.

13. The information processing method according to claim 11, wherein the computer detects the person based on an image taken with a camera included in the vehicle.

14. The information processing method according to claim 13, wherein the computer analyzes the image to detect a person other than a user associated with the vehicle.

15. The information processing method according to claim 10, wherein the computer opens the window when a difference between the temperatures inside and outside the vehicle is equal to or more than a prescribed temperature difference.

16. The information processing method according to claim 10, wherein the computer generates a command to give a notification to an inside or an outside of the vehicle when opening and closing the window.

17. The information processing method according to claim 10, wherein the computer generates a command to open or close the window included in the vehicle based on the information about the temperature inside or outside the vehicle, when receiving a request to open or close the window from a user terminal associated with the vehicle.

18. A system comprising:
    a vehicle including a window that is operable by remote operation; and
    a server configured to transmit to the vehicle a command about an opening degree of the window, wherein:
    the vehicle is configured to acquire information about a temperature inside or outside the vehicle and transmit the information to the server;
    the vehicle is configured to acquire position information of the vehicle and transmit the position information to the server; and
    the server is configured to generate a command to open or close the window included in the vehicle based on the information about the temperature inside or outside the vehicle and transmit the command to the vehicle,
    wherein an opening degree of the window is set in accordance with the position information of the vehicle, so that when the vehicle is parked in a previously registered location the opening degree of the window is set to be larger than when the vehicle is parked in an unregistered location.

19. The information processing device according to claim 1, wherein the control unit is configured to:
    when the vehicle is parked at home, set the opening degree of the window to be at a maximum opening, regardless of a difference between the temperature inside the vehicle and the temperature outside the vehicle, and
    when the vehicle is parked at locations other than at home, set the opening degree of the window (i) according to the difference between the temperature inside the vehicle and the temperature outside the vehicle and (ii) based upon whether the vehicle is parked at a previously registered location.

20. The information processing method according to claim 10, wherein the computer:
- when the vehicle is parked at home, sets the opening degree of the window to be at a maximum opening, regardless of a difference between the temperature inside the vehicle and the temperature outside the vehicle, and
- when the vehicle is parked at locations other than at home, sets the opening degree of the window (i) according to the difference between the temperature inside the vehicle and the temperature outside the vehicle and (ii) based upon whether the vehicle is parked at a previously registered location.

* * * * *